(12) United States Patent
Kitada

(10) Patent No.: US 7,485,160 B2
(45) Date of Patent: Feb. 3, 2009

(54) HYDROGEN GENERATING APPARATUS, HYDROGEN GENERATING SYSTEM AND USE THEREOF

(75) Inventor: Masayoshi Kitada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 489 days.

(21) Appl. No.: 10/503,004

(22) PCT Filed: Jan. 23, 2003

(86) PCT No.: PCT/JP03/00590

§ 371 (c)(1),
(2), (4) Date: Apr. 15, 2005

(87) PCT Pub. No.: WO03/064318

PCT Pub. Date: Aug. 7, 2003

(65) Prior Publication Data

US 2005/0175517 A1   Aug. 11, 2005

(30) Foreign Application Priority Data

Jan. 29, 2002   (JP)   ............... 2002-020439

(51) Int. Cl.
- *B01J 7/00*   (2006.01)
- *B01J 27/06*   (2006.01)
- *C25D 17/00*   (2006.01)
- *C25B 1/00*   (2006.01)

(52) U.S. Cl. ............... 48/61; 502/224; 204/194; 205/345; 205/346

(58) Field of Classification Search ............... 48/61, 48/197 R; 502/224; 204/194; 205/345, 205/346

See application file for complete search history.

(56) References Cited

U.S. PATENT DOCUMENTS

| | | | | |
|---|---|---|---|---|
| 3,609,364 A | * | 9/1971 | Paine et al. | 250/372 |
| 4,009,006 A | * | 2/1977 | Hreha | 422/222 |
| 4,200,062 A | * | 4/1980 | Duckworth | 123/1 A |
| 4,236,993 A | * | 12/1980 | Muller et al. | 204/294 |
| 4,427,523 A | * | 1/1984 | Oda et al. | 204/284 |
| 4,511,450 A | * | 4/1985 | Neefe | 204/278 |
| 4,765,874 A | * | 8/1988 | Modes et al. | 205/635 |
| 4,767,953 A | * | 8/1988 | Furuya et al. | 310/11 |
| 4,927,800 A | * | 5/1990 | Nishiki et al. | 502/349 |
| 5,019,235 A | * | 5/1991 | Nyberg et al. | 204/282 |
| 5,272,871 A | * | 12/1993 | Oshima et al. | 60/274 |
| 5,395,510 A | * | 3/1995 | Kikuchi et al. | 205/138 |
| 5,712,062 A | * | 1/1998 | Yamana et al. | 429/231.7 |
| 5,853,690 A | * | 12/1998 | Hibino et al. | 423/483 |
| 6,060,026 A | * | 5/2000 | Goldstein | 422/186 |
| 6,068,921 A | * | 5/2000 | Yamana et al. | 428/402 |
| 6,287,431 B1 | * | 9/2001 | Murphy et al. | 204/258 |
| 6,712,951 B2 | * | 3/2004 | Andrews et al. | 205/626 |
| 6,790,476 B1 | * | 9/2004 | Jennison et al. | 427/255.7 |
| 7,182,851 B2 | * | 2/2007 | Gomez | 205/637 |
| 2002/0107140 A1 | * | 8/2002 | Hampden-Smith et al. | 502/185 |

FOREIGN PATENT DOCUMENTS

| | | |
|---|---|---|
| JP | 57-149802 | 9/1982 |
| JP | 4-59601 | 2/1992 |

OTHER PUBLICATIONS

Edited by Kagaku Daijiten Henshu Iinkai, "Kagaku Daijiten 3 reduced-size edition", Kyoritsu Shuppan Co., Ltd., Nov. 10, 1979, pp. 853-854.

* cited by examiner

*Primary Examiner*—Walter D Griffin
*Assistant Examiner*—Huy-Tram Nguyen
(74) *Attorney, Agent, or Firm*—Hamre, Schumann, Mueller & Larson, P.C.

(57) ABSTRACT

A hydrogen generation apparatus is constituted of a treated-substance container, which has a hydrogen discharge port for activating a treated substance; and at least one plate-form activation structural body, which is provided within the treated-substance container vertically thereto. The plate-form activation structural body is a structural body that arranges particles composed of any of a single constituent element, which is selected from a group comprising silicon, titanium, nickel, and samarium, and fluorocarbon at positions that amplify unique wave energy in each the element and the fluorocarbon, and which structural body has an energy concentration field between the particles within the treated-substance container, wherein gases containing hydrogen are generated by any of the treated substance within the treated-substance container staying in and passing through the energy concentration field. The hydrogen generation apparatus can generate hydrogen with less energy and achieve space saving.

5 Claims, 19 Drawing Sheets

FIG.2A The Present Invention
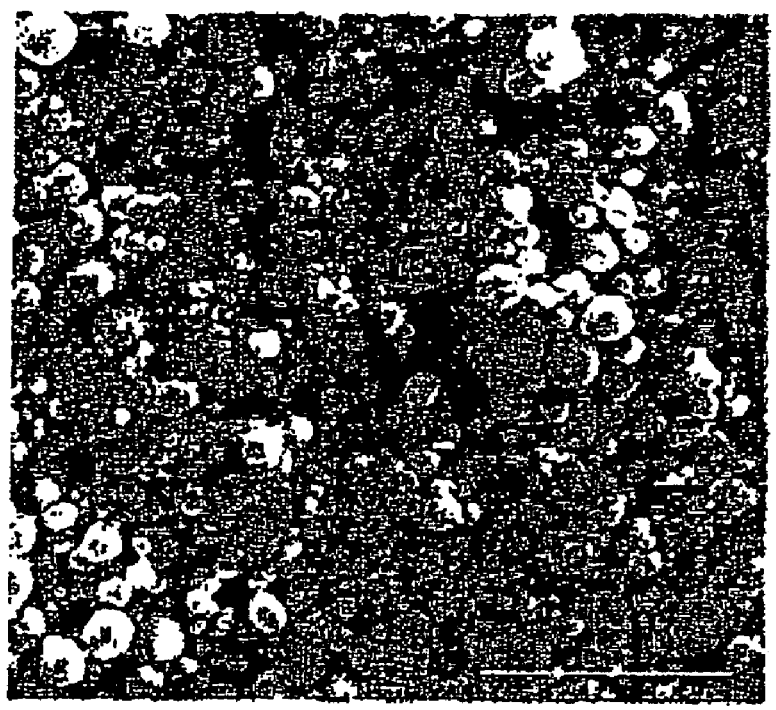
FIG.2B Comparison Example
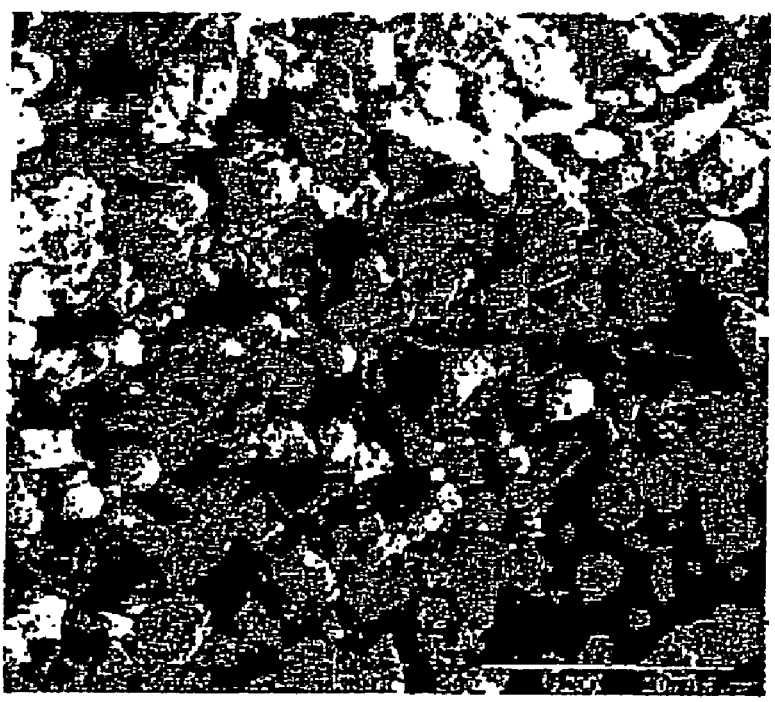

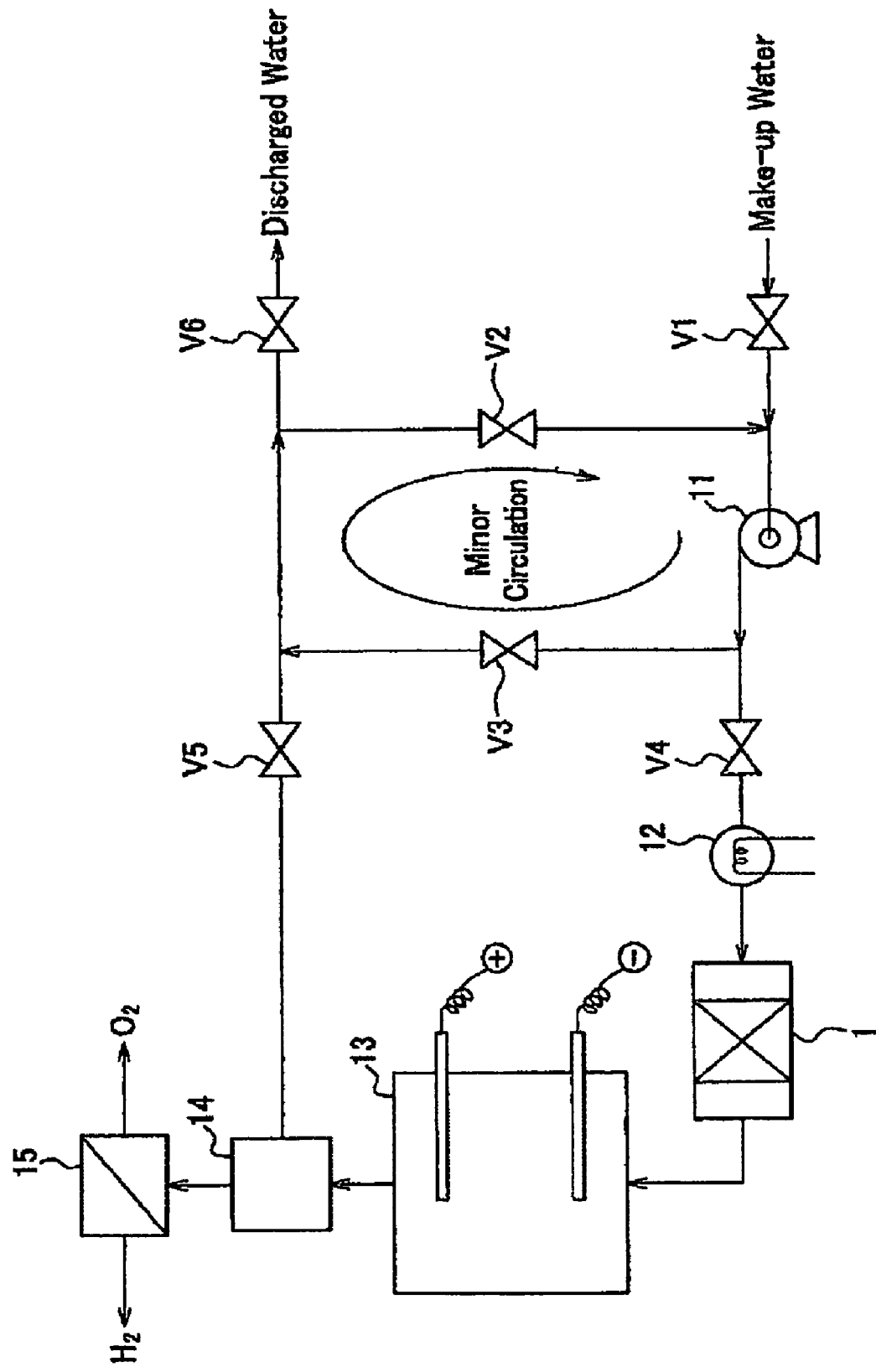

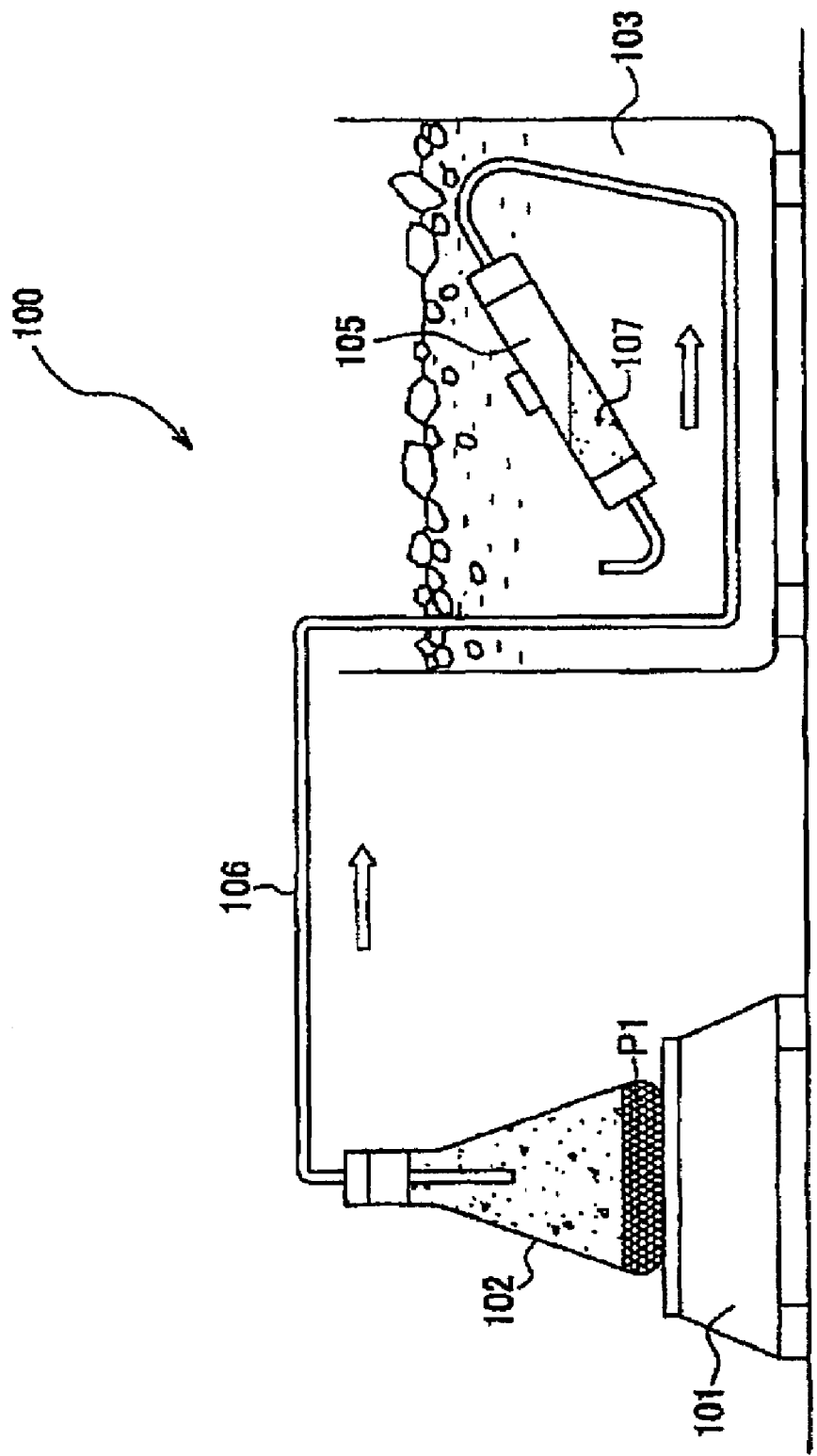

HYDROGEN GENERATING APPARATUS, HYDROGEN GENERATING SYSTEM AND USE THEREOF

FIELD OF THE INVENTION

The present invention relates to a hydrogen generation apparatus, a hydrogen generation system, and an application thereof To be more precise, the present invention relates to: the hydrogen generation apparatus and a function for generating gases containing hydrogen by making particles hydrogen generation system that use an activation structural body, which has composed of a specific element have an energy concentration field, making a treated substance pass through and stay in the energy concentration field, and thereby activating the treated substance; and various applications utilizing such the hydrogen generation system.

BACKGROUND OF THE INVENTION

These years hydrogen is taken notice of as an alternative fuel for petroleum from viewpoints such as a depletion of existing resources such as the petroleum and a discharge of carbon dioxide.

Conventionally, in order to manufacture the hydrogen as such an energy source, electrolysis of water and the like is general.

For example, in electrolyzing the water the hydrogen is generated according to a following equation (1):

$$H_2O \rightarrow H_2 + \tfrac{1}{2}O_2. \tag{1}$$

In this case, although in order to obtain the hydrogen by electrolyzing the water, a potential difference of 1.23V is needed, it is impossible to electrolyze the water due to a high electric resistance thereof unless the potential difference not less than 1.23 V is given to the water. Therefore, although in order to generate the hydrogen, a solution where an electrolyte such as alkali is dissolved is electrolyzed, it is necessary to remove an alkali compound generated as a byproduct and there is also a problem that a decomposition index is low.

As another method for generating hydrogen, a thermal decomposition of water is thought. However, in order to obtain the hydrogen by thermally decomposing the water, it is necessary to decompose it under a high temperature of around 4,300 degrees Celsius and thereby larger energy is needed, so it is not practical.

In addition, because although as a method for generating hydrogen, is thought the method for chemically reacting a metal and the water by adding an alkali metal such as aluminum, such the metal is comparatively expensive and the chemical reaction is rapid, so it is difficult to industrially utilize the method.

Because although an organic compound such as methanol is comparatively small in bonding energy of hydrogen and carbon and a potential difference necessary for electrolysis thereof results in being less, a generation of byproducts such as CO and $CO_2$ is accompanied in an electrolysis reaction of the organic compound, it is difficult to use the organic compound as clean energy as it is, and it is necessary to take a countermeasure for removing the byproducts.

Thus many trials for using hydrogen as energy are performed. For example, are cited a fuel cell system, a vehicle for mounting the fuel cell system (a fuel cell automobile and a hybrid automobile equipped with both of a fuel cell system and an internal combustion engine), the internal combustion engine, an external combustion engine, a hybrid fuel automobile, further a rocket that makes the hydrogen a power source, and the like. In this connection, the fuel cell system is also taken notice of as an application for a portable device.

When using hydrogen for such the purposes, it is desired that a hydrogen generation system for generating the hydrogen is downsized.

Conventionally, hydrogen is manufactured by being reformed under an existence of a catalyser, for example, making organic compounds such as methanol and gasoline starting materials. However, because when manufacturing the hydrogen by using such a reforming reaction, a byproduct such as CO is generated due to a low selectivity, it is necessary to take a countermeasure to remove the byproduct. Furthermore, because the reforming reaction proceeds under a high temperature, a great deal of energy is needed.

Still furthermore, because the organic compounds, which are the starting material, are a limited resource, there is a request that a recyclable resource is wanted to be made the starting material.

Accordingly, there are strong requests for an apparatus, which generates hydrogen used as such recyclable energy with less energy and preferably without giving energy from an outside; and a hydrogen generation system equipped with the hydrogen generation apparatus; particularly for the hydrogen generation apparatus and hydrogen generation system that can save space for mounting the fuel cell system, the fuel cell system mount vehicle, further the rocket that makes the hydrogen the power source, and the like.

Furthermore, there is a strong request for a hydrogen generation apparatus and hydrogen generation system that can generate a sufficient amount of hydrogen by less energy being given from recyclable resources such as water and sea water.

Accordingly, a problem of the present invention is to provide the hydrogen generation apparatus, which can generate hydrogen with less energy and achieve space saving, and the hydrogen generation system equipped with the hydrogen generation apparatus.

The inventor formerly filed a patent, as a result of a dedicated study taking the problem into consideration and finding that: when arranging particles composed of a predetermined metal element at a predetermined array, high energy is generated between the particles, and a substance is activated with using the energy (Japanese Patent Application, 2001-021734).

In accordance with the patent application it is described that various substances can be activated by arranging particles composed of any of a single constituent element selected from a group comprising silicon, nickel, titanium, and samarium, and fluorocarbon at positions, which amplify unique wave energy in any of each the element and the fluorocarbon an activation structural body, which makes an energy concentration field exist between the particles, generating high energy (interaction thereby) between the particles, that is, the energy concentration field being generated; and making the various substances pass through and stay in the energy concentration field.

DISCLOSURE OF THE INVENTION

The present invention is performed, based on this knowledge, and has run into completion thereof finding that something, which is an activation structural body molded into a plate form and arranged at a predetermined position within a predetermined container, solves the problem.

In other words, the present invention is a hydrogen generation apparatus constituted of a treated-substance container, which has a hydrogen discharging port for activating a treated substance, and the activation structural body, which has an energy concentration field between particles within the treated substance container, and relates to the hydrogen generation apparatus characterized in that gases containing hydrogen are generated by any of the treated substance within the treated-substance container passing through and staying in the energy concentration field.

Thus constituted, is provided the hydrogen generation apparatus, which can generate hydrogen from the treated substance with a simple constitution and without almost using external energy.

In addition, the present invention relates to a hydrogen generation apparatus that is an activation structural body, which arranges particles composed of a single constituent element selected from a group comprising any of silicon, nickel, titanium, and samarium; and fluorocarbon at positions that amplify unique wave energy in any of each the element and the fluorocarbon, and which structural body makes an energy concentration field exist between the particles.

Thus constituted, because the treated substance passes through an inside of the activation structural body, that is, passes through the energy concentration field in the activation structural body, it can be made to effectively activate the treated substance and generate hydrogen.

In addition, the activation structural body described is preferable to be molded into a plate form, may be a structure where generation gases and a fluid swiftly separate for an inside of the treated substance container, and may be arranged at a position where contact of the fluid and a catalyser is not impeded by the generation gases.

Furthermore, the activation structural body may be arranged in a vertical direction for the inside of the treated substance container and also be provided so as to compartmentalize the activation structural body in an up/down direction.

Thus convection of the treated substance is generated along a sectional length of the (plate-form) activation structural body. By such the convection increases a probability, where the treated substance passes through the energy concentration field in the (plate-form) activation structural body. Accordingly, it can be made to effectively activate the treated substance and generate hydrogen.

Meanwhile, "providing the plate-form activation structural body in a vertical direction for the inside of the treated-substance container" means that it is not limited to "a shape of the plate-form activation structural body," "a side direction of the plate-form activation structural body," and "an arrangement position" of the plate-form activation structural body.

In other words, the activation structural body (plate-form activation structural body) may be circular, elliptical, quadrate, rectangular (preferably rectangular) in a shape of face directions thereof. In addition, for example, in shapes having a long side (long axis) and a short side (short axis) such as a rectangle and an ellipse, it is preferable to vertically provide the long side (long axis) for the treated-substance container.

In addition, the plate-form activation structural body may be arranged in contact with a bottom face and a side face of the activation structural body and be arranged without contacting them by a retention means.

A terminology "activation" applied to the present invention comprehends giving energy to molecules and atoms that are treated substances. Accordingly, the terminology "activation" applied to the present invention means that it comprehends exciting the molecules and the atoms.

Meanwhile, "arranging the plate-form activation structural body so as to compartmentalize the treated-substance container in an up/down direction" means that it is also acceptable to compartmentalize the treated-substance container in the up/down direction by any of one plate-form activation structural body and other respective plate-form activation structural bodies.

In addition, it is preferable to have a constitution combining that of "arranging the plate-form activation structural body so as to compartmentalize the treated-substance container in the up/down direction" with that of "providing the plate-form activation structural body in a vertical direction for the inside of the treated-substance container.

Thus constituted, a contact area of the treated substance and the plate-form activation structural body, that is, a probability where the treated substance invades (passes through/stay in) the energy concentration field increases and the convection of the treated substance occurs along the sectional length of the activation structural body. Accordingly, it can be made to efficiently activate the treated substance.

Meanwhile, in the hydrogen generation apparatus of the present invention having such the constitution, it is preferable to make the constitution, where the convection of the treated substance is forcibly brought about by providing a heater for heating the (plate-form) activation structural body, the treated-substance container, and both. Thus constituted, because the convection of the treated substance becomes adjustable, an activation speed of the treated substance becomes adjustable.

For a purpose of enjoining a same effect, the constitution can also be designed to provide a shaking means for shaking the plate-form activation structural body.

In addition, in the hydrogen generation apparatus of the present invention having such the constitution, it is preferable to provide a circulation means for circulating the treated substance within the hydrogen generation apparatus instead of the constitution providing the heater or in combination with the heater. Thus constituted, because the convection of the treated substance becomes adjustable, the activation speed of the treated substance becomes adjustable.

Furthermore, in the hydrogen generation apparatus of the present invention having such the constitution, it is preferable to provide a movement mechanism for relatively moving a contact area of an up/down direction of the activation structural body and the treated substance.

Thus constituted, because it can be made to freely change the contact area of the activation structural body and the treated substance, it can be made to appropriately adjust activation of the treated substance, a stoppage of the activation, and a stoppage of the activation speed.

Meanwhile, a preferable movement mechanism means is a spare bath of the treated substance, which comprises a vertical directional movement means for moving the plate-form activation structural body in a vertical direction and a movement means such as a circulation pump provided at a hydrogen generation apparatus main body.

In addition, the treated substance is preferable to be any of water, an aqueous medium, an organic compound, and a mixture of these.

Particularly, electing any of the water and the aqueous medium as the treated substance, it is activated by the activation structural body of the present invention, and mixture gases containing hydrogen, oxygen, and nitrogen can be obtained. Separating the hydrogen from the mixture gases thus obtained by an appropriate means, mixture gases of the oxygen and the nitrogen are obtained.

A terminology "organic compound" applied to the present invention means a organic compound that can alienate hydrogen, utilizing the plate-form activation structural body applied to the hydrogen generation apparatus of the present invention, that is, comprehends saturated and unsaturated fatty hydrocarbons, which have an O—H bonding or a C—H bonding that can alienate the hydrogen; aliphatic alcohol such as methanol and ethanol; aliphatic aldehyde; aliphatic ketone; gasoline; petroleum ether; and the like.

Hydrogen is taken much notice of as alternative energy of various existing energy commencing with a fossil fuel. It can be made to alienate the hydrogen from such water and an organic compound, and particularly in the present invention it can be made to selectively manufacture the hydrogen from the water and the organic compound without a generation of byproducts.

The hydrogen generation apparatus can also be effectively utilized in a hydrogen generation system. The hydrogen generation apparatus can also be utilized as a main hydrogen generation apparatus and a hydrogen generation auxiliary apparatus.

Such the hydrogen generation system can be effectively utilized as an internal combustion engine, an external combustion engine, a fuel cell system, a hydrogen rocket, a vehicular hydrogen engine, and the like.

BRIEF DESCRIPTION OF THE DRAWINGS

FIG. 1A is a drawing showing one example of a whole of an activation structural body applied to the present invention; FIG. 1B is a drawing showing one example of a fundamental arrangement of an activation structural body applied to the present invention shown in FIG. 1A; FIG. 1C is a perspective view showing another example of a whole of a preferred activation structural body; and FIG. 1D is a perspective view showing one example of a fundamental arrangement of the activation structural body shown in FIG. 1C.

FIGS. 2A and 2B are electron microscope photos showing shapes of particles, which compose an activation structural body applied to the present invention, and those of comparison particles, respectively.

FIG. 3A is a perspective view showing a figuration before an activation structural body applied to the present invention is molded into an I-shape plate form; FIG. 3B shows a perspective view when the activation structural body applied to the present invention is molded into an L-shape plate form; FIG. 3C shows a perspective view when the activation structural body applied to the present invention is molded into a U-shape plate form; and FIG. 3D shows a perspective view when the activation structural body applied to the present invention is molded into an S-shape plate form.

FIG. 19 is a more concrete outline constitution drawing of a hydrogen generation system of the present invention.

FIG. 20 is a constitution drawing of an apparatus applied to an experiment, which is performed to verify an effect by a hydrogen generation apparatus of the present invention.

DESCRIPTION OF THE MOST PREFERRED EMBODIMENTS

Figure 1A:
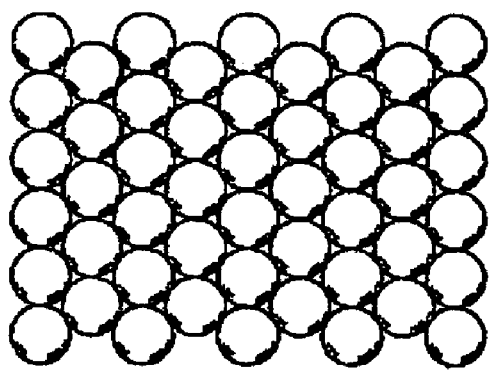
FIGS. 1A to 1D are drawings showing examples of arrangements of activation structural bodies applied to the present invention.

Here will be described the embodiments of the present invention in detail, referring to appended drawings.

(Activation Structural Body)

First, a fundamental constitution of an activation structural body applied to the present invention will be described, using FIGS. 1A to 2B.

(Constituent Element)

The activation structural body applied to the present invention is composed of an element selected from a group comprising silicon, nickel, titanium, and samarium. A selection of these elements is led out of repeated experimental results of the inventor described later: Silicon, nickel, and titanium are metal elements, whose number of planetary electrons of an atomic outmost nucleus orbit (M and N) is even, and which elements are difficult to react to oxygen; samarium is a rare earth metal, whose number of planetary electrons of an atomic outmost nucleus orbit (M and N) is even (two), and which element is difficult to react to oxygen. Meanwhile, nickel and samarium are characterized by having strong magnetism.

Although the activation structural body applied to the present invention uses these. elements as a simple substance, purity then is appropriately selected by kinds of applied elements, kinds of materials that are intended to be activated, and the like. For example, when the activation structural body uses silicon, activates water, and generates hydrogen and oxygen, purity of the silicon is not less than about 90%, preferably not less than 95%. The higher the purity is, the more preferable it is. In addition, other elements that can compose the activation structural body, that is, titanium, nickel, and samarium are preferable to be the same purity. In addition, although the activation structural body is generally composed of, for example in case of silicon, single silicon, the activation structural body may also be composed by combining each of such the single elements.

Although the activation structural body uses such an element as particles by pelletizing it, they are preferable to be spherical, particularly, true spherical from a viewpoint such as arrangement easiness into predetermined positions and easiness of pelletizing, and a particle diameter then is preferable to be made 5 μm to 80 μm. It is comparatively difficult to manufacture particles having a particle diameter of not more than 5 μm and comparatively becomes difficult to pass a substance through spacing of the particles, which is an energy concentration field described later, when arranging them at the predetermined positions. In addition, when the particle diameter exceeds 80 μm, sufficient energy is not generated between the particles in arranging them. Generally, if the particle diameter exceeds 150 μm, it becomes difficult for energy, which activates the substance according to the present invention, to be generated.

In addition, the narrower a particle size distribution of these particles is, the more preferable it is. To be more precise, as a result of repeated preparatory experiments of the inventor, it turned out that a remarkable effect can be brought out when a deviation of the particle diameter is within ±15 μm (that is, an absolute error of the particle diameter is within 30 μm).

A method for pelletizing a specific element in the present invention into such the shapes is not specifically limited and a generally known pelletizing method in a catalyser manufacturing field is applicable. A gas atomization method is preferable from a viewpoint that manufacturing is simple and particle shapes can be made comparatively uniform. However, the activation structural body is not specifically limited to the gas atomization method if the particles described above are formed, for example, a conventional known method such as a sol-gel method can be preferably used.

In addition, for example, the spherical particles can be manufactured by a jet pulverization method. The jet pulverization method is a general method for manufacturing catalyser particles same as the gas atomization method and also applicable to manufacturing each particle in the activation structural body of the present invention.

Figure 1B:
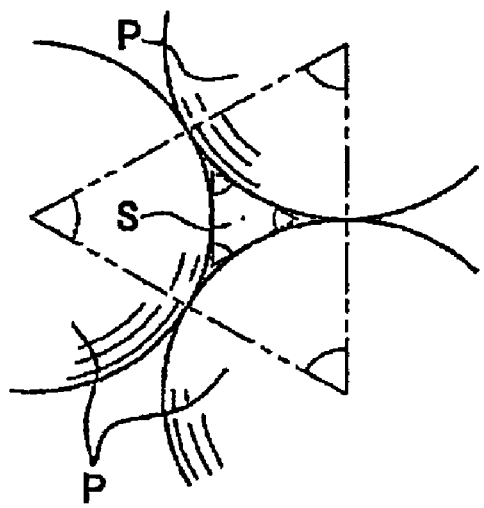
Figure 1C:
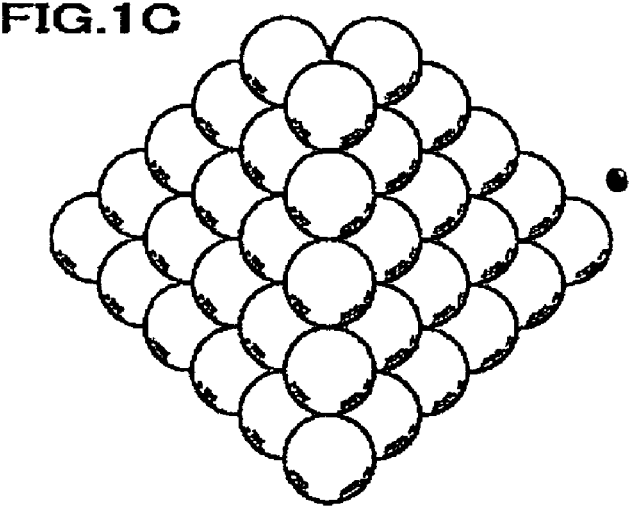

As shown in FIG. 1B. arrange particles P. which are in the present invention thus composed of any of elements selected from a group comprising silicon, titanium, nickel, and samarium, at positions that amplify wave energy.

In other words, each of these elements for composing the activation structural body has a unique frequency expressed by an equation: E=hν (where, E is unique ionization energy (eV), h is Planck's constant, and ν is a frequency), for example, as shown in Table 1, respectively, and each of these elements for composing the activation structural body oscillates electromagnetic field oscillation. And such the electromagnetic field oscillation has a predetermined fluctuation. From this, these elements for composing the activation structural body are surmised to have a unique oscillation in a normal state; give oscillation energy to a substance passing through and staying in an air gap S formed between the particles P by arranging the particles P at the positions, where the unique oscillation is effectively given to each of these elements; and therefore, are surmised to activate the substance.

TABLE 1

| Element | Ionization Energy (eV) | Frequency (×10$^{15}$ Hz) |
|---|---|---|
| Si | 8.144 | 1.971 |
| Ni | 7.63 | 1.846 |
| Ti | 6.82 | 1.649 |
| Sm | 5.63 | 1.361 |

In addition, although it is not clear by what-like reason a same action/effect is shown, the inventor has found that fluorocarbon (FC) also shows the same action/effect as in case of using the metal elements when he/she farther repeatedly performed experiments. Accordingly, the activation structural body comprehends particles composed of the fluorocarbon.

The activation structural body applied to the present invention is verified by the repeated experiments, based on such the surmise: If when each particle is assumed to be substantially a uniform size (true sphere having a same particle diameter), for example, each particle is arranged at an apex of an equilateral triangle as shown in FIG. 1B, each particle is found to show high activation. That is, when in the present invention a substance passes through and stays in the air gap S (energy concentration field) between the particles P composed of a specific element, high energy is given to the substance thanks to a unique oscillation/fluctuation and the like of each element, which composes the activation structural body.

The activation structural body applied to the present invention arranges particles, which are composed of a predetermined element, at such the positions. Meanwhile, because in fact each particle does not always become a complete sphere and a particle diameter thereof is not constant, it is practically difficult to accurately arrange each particle at each apex of an equilateral triangle. A terminology "arrange each particle at each apex of an equilateral triangle" means that such an error range is included therein, and for example, means to arrange each particle as shown in FIG. 2A, which is a reference drawing. Meanwhile, in FIG. 2A the particles P manufactured by the gas atomization method are sieved through a sieve of 52 micron mesh, and particles (particles of a uniform size) passing through the sieve are collected and arranged.

In addition, when as shown in FIG. 1B, the particles are arranged at apexes of the equilateral triangle, a triangle formed in the air gap S between the particles P, that is, each apex angle of the triangle formed of intersections of tangents of the particles P is requested to be not more than 90 degrees, preferably 39 to 70.5 degrees, and ideally about 60 degrees.

Figure 1D:
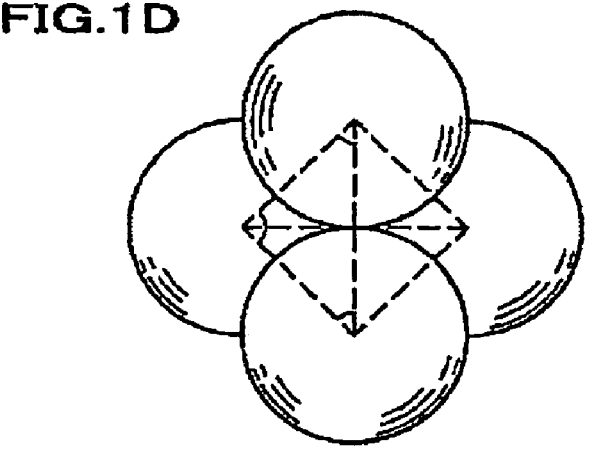

In addition, as shown in FIG. 1D, it is found that highest activation is shown when each particle related to the present invention is arranged at apexes of a tetrahedron. That is, a tetrahedron structure becomes a structure where an equilateral triangle structure, which gives high energy to a substance, is arranged at four faces and a higher energy concentration field is constituted by the unique oscillation/fluctuation of each element for composing the activation structural body, when in the present invention the substance passes through and stays in the air gap S (energy concentration field) between the particles P composed of a specific element. Same as in the equilateral triangle structure, in the present invention particles composed of a predetermined element are arranged at such the positions. Meanwhile, because in fact each particle does not always become a complete sphere and a particle diameter of each particle is not constant, it is practically difficult to accurately arrange each particle at each apex of the tetrahedron. Accordingly, a terminology "arrange each particle at each apex of the tetrahedron" means that such an error range is included therein, and for example, means to arrange each particle as shown in FIG. 2A, which is a reference drawing. Meanwhile, in FIG. 2A the particles P manufactured by the gas atomization method are sieved through a sieve of 52 micron mesh, and particles (particles of a uniform size) passing through the sieve are collected and arranged.

Same as a figuration where each particle is arranged at an apex of an equilateral triangle, in each equilateral triangle constituting a tetrahedron each apex angle of a triangle formed in the air gap S between the particles P, that is, the triangle formed of intersections of tangents of the particles P, is requested to be not more than 90 degrees, preferably 39 to 70.5 degrees, and ideally about 60 degrees.

In addition, positions that amplify wave energy in the activation structural body applied to the present invention are not limited to those of the apexes of the tetrahedron. If when a substance passes through and stays in the gap S (energy concentration field) between the particles P composed of a specific element, high energy can be given to the substance at the positions thanks to the unique oscillation/fluctuation and the like of each element, the positions are not specifically limited. That is, for example, when as shown in FIG. 2B, particles of irregular shapes axe randomly arranged, the unique oscillation in each element cancels each other and a high energy field becomes difficult to be generated in a gap existing between each particle, and thereby activation of a treated substance results in not occurring. The particles shown in FIG. 2B are ones sieved through a sieve of 52 micron mesh, and collected and arranged after a raw material substance adhered to a chamber wall surface of a gas atomization apparatus is pulverized.

(Plate-Form Activation Structural Body)

The present invention uses a plate-form activation structural body, where an activation structural body having such the fundamental composition, is molded into a plate form. Here will be described the plate-form activation structural body applied to the present invention (hereinafter simply referred to as the "plate-form activation structural body"), referring FIGS. 3A to 4C.

(Constitution of Plate-Form Activation Structural Body)

The plate-form activation structural body is something where the activation structural body, which has such the fundamental composition, is molded into the plate form. That is, the plate-form activation structural body can be composed by molding the particles described above with various molding methods such as a compression molding and a sinter molding. That is, as shown in FIG. 1A, arrange each of the particles P composed of any of a single constituent element selected from a group comprising silicon, nickel, titanium, and samarium; and fluorocarbon so as to be arrayed at the air gap S, which amplifies unique wave energy in any of each the element and the fluorocarbon, typically at an apex of an equilateral triangle, preferably a tetrahedron. And under heating, for example, by heating at a temperature not more than a melting temperature of the particles P and compressing them, a plate-form activation structural body as shown in FIG. 3B can be obtained.

Figure 3A:
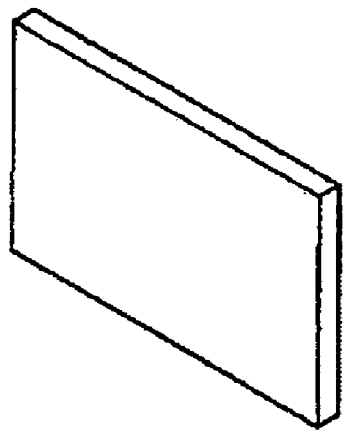
FIGS. 3A to 3D are drawings showing examples of preferred figurations of activation structural bodies applied to the present invention.
Figure 3B:
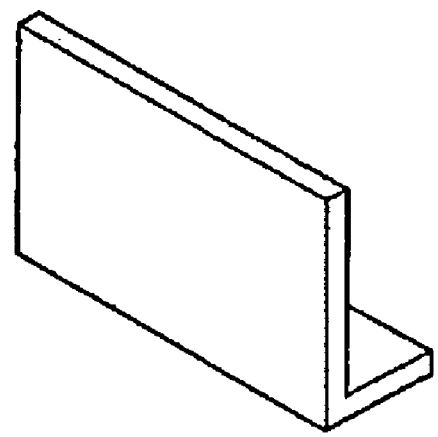
Figure 3C:
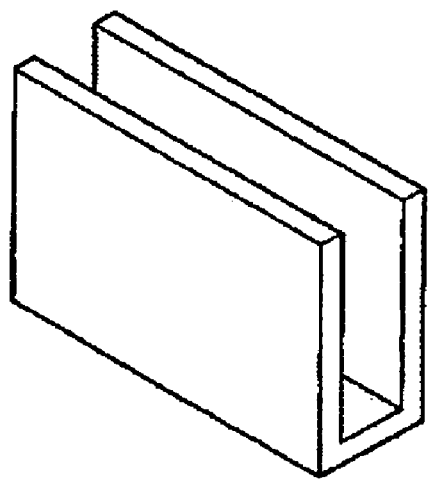
Figure 3D:
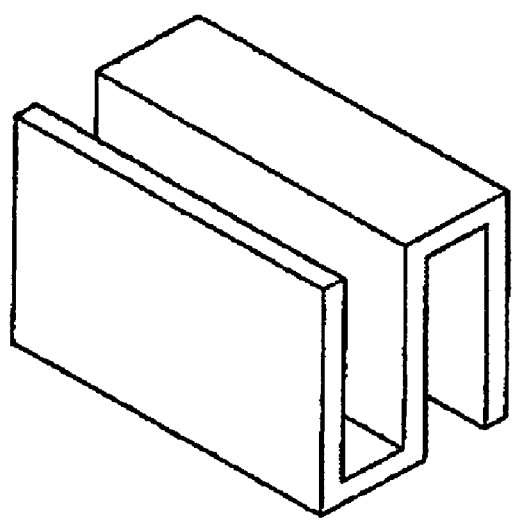

In addition, depending on constitutions of hydrogen generation apparatuses constituted of plate-form activation structural bodies described later, the structural bodies can be formed into those of an L-shape as shown in FIG. 3B, a U-shape as shown in FIG. 3C, and an S-shape as shown in FIG. 3D. Meanwhile, the plate-form activation structural body referred in the present invention is not specifically limited to a shape thereof if it is an activation structural body with a predetermined thickness, width, and length, and terms "L-shape," "U-shape," and "S-shape" may not strictly mean shapes of "L-shape," "U-shape," and "S-shape." For example, the plate-form activation structural body of the "U-shape" may also be a figuration consisting of three vertical plate forms without a curved portion.

Figure 4A:
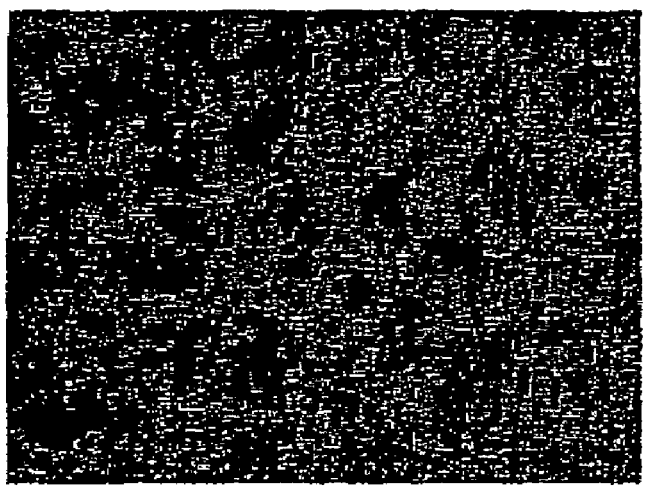
FIGS. 4A to 4C are electron microscope photos showing shapes of particles of the present invention and those of comparison particles, wherein both of the particles compose the activation structural body molded into the plate form applied to the present invention in FIG. 3A, respectively.

In such a plate-form activation structural body, as shown in FIG. 4A, many air gaps S, which are an energy concentration field, are formed between the particles P (a preferable figuration of these air gaps is omitted because it is same as in a particulate activation structural body described before). That is, even when molded into a plate form, a same activation effect of a substance is shown by arranging particles composed of any of silicon, nickel, titanium, and samarium; and fluorocarbon at positions, which amplify unique wave energy in any of each the element and the fluorocarbon, specified in the present invention.

Figure 4B:
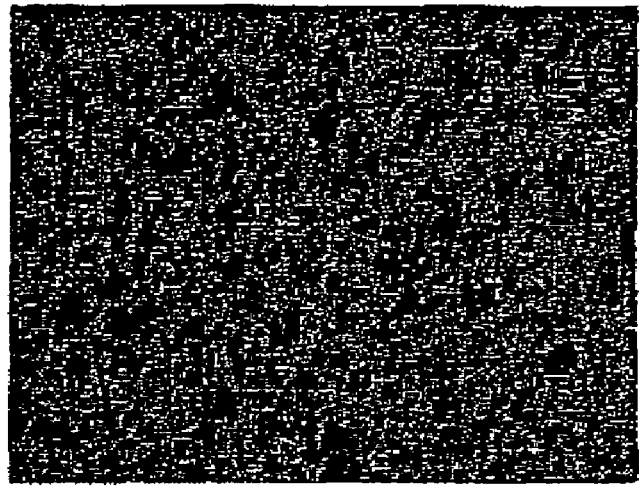

On the other hand, even if when arranging the particles out of a range specified in the present invention as shown in FIG. 4B, there are a certain degree of air gaps between the particles, the activation effect of the substance (of the present invention), which the activation structural body has, is not shown.

Meanwhile, although the plate-form activation structural body can be made various sizes depending on applied purposes, a thickness thereof is 350 μm to 1,500 μm, preferably 500 μm to 1,000 μm (that is, a state where particles composing the activation structural body of the present invention are stacked by 5 to 15 layers is preferable) in order to efficiently lead (stay and pass) a treated substance to an energy concentration field specified in the present invention. When the thickness is smaller than the above range, care becomes necessary for handling a breakage and the like; on the contrary, when the thickness is larger than the above range, in some case the treated substance cannot be sufficiently led to the energy concentration field in the plate-form activation structural body.

As a whole of a structural body, the plate-form activation structural body is preferably in a range of 45 to 60%, particularly, about 50% in an air gap ratio. Using the plate-form activation structural body having the above range in the air gap ratio, it can be made to lead the treated substance to the energy concentration field in the plate-form activation structural body with a comparatively little flow amount (pressure) and treat the treated substance. When the air gap ratio of the plate-form activation structural body is larger than the above range, a high pressure becomes necessary in treating the treated substance and in some case occurs a clogging of the energy concentration field due to a breakage of the plate-form activation structural body and impurities in the treated substance. On the contrary, when the air gap ratio of the plate-form activation structural body is smaller than the above range, in some case the treated substance is difficult to be activated because a staying-in/passing-through time cannot be sufficiently spared at the energy concentration field of the plate-form activation structural body. Meanwhile, the most preferable air gap ratio of the plate-form activation structural body is about 50%.

(Manufacturing of Particulate Activation Structural Body)

Here will be described a manufacturing method of a particulate activation structural body applied to the present invention.

(Manufacturing of Particles: Step A)

In a preferred embodiment of the present invention, the activation structural body of the present invention can be made various shapes of activation structural bodies other than plate-form activation structural bodies. Here will be described particulate activation structural bodies of the present invention, referring to FIGS. 5A to 6F.

Figure 5A:
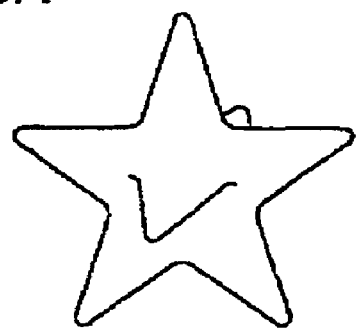
FIGS. 5A to 5G are perspective views showing each one example of other shapes of activation structural bodies applied to the present invention.
Figure 5B:
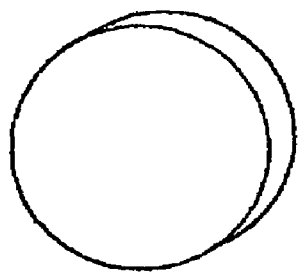
Figure 5C:
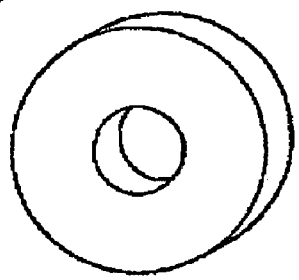
Figure 5D:
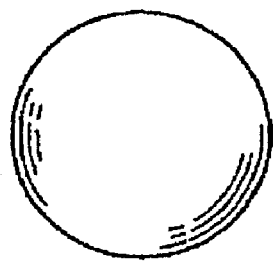
Figure 5E:
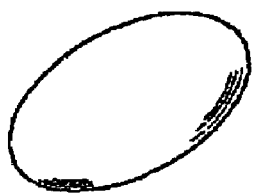
Figure 5F:
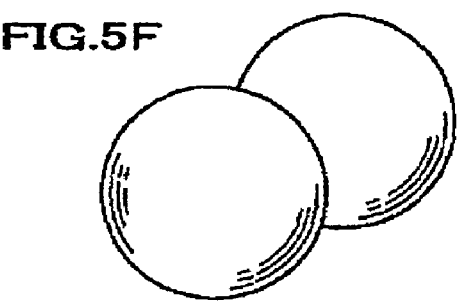
Figure 5G:
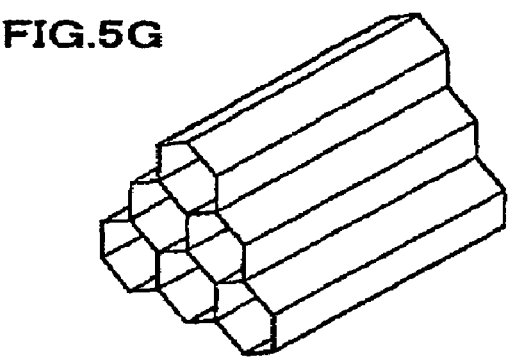
Figure 6A:
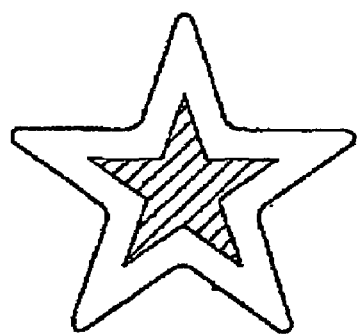
FIGS. 6A to 6F are sectional views showing sectional shapes, respectively, when a core of an activation structural body shown in each of FIGS. 5A to 5F is provided.
Figure 6B:
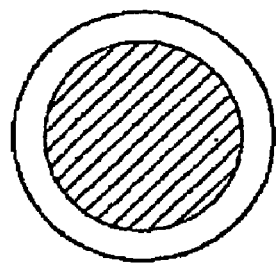
Figure 6C:
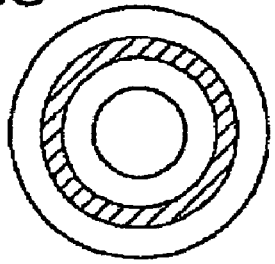
Figure 6D:
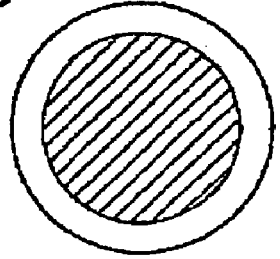
Figure 6E:
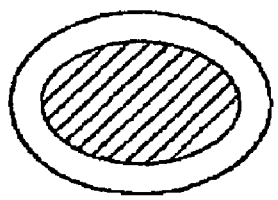
Figure 6F:
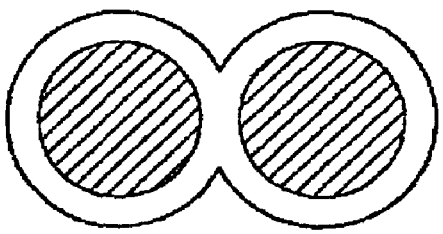

The activation structural body of the present invention can be molded into, for example, various shapes other than the plate-form activation structural bodies. For example, they can be molded into shapes such as a star shape (confection shape) (FIG. 5A), a disc (FIG. 5B), a plate form having at least one hole (FIG. 5C), a sphere (FIG. 5D), a rotational elliptic body (FIG. 5E), a gourd shape (FIG. 5F), and a honeycomb shape (FIG. 5G). That is, for example, by molding the particulate activation structural bodies (activation structural blocks) of the present invention into same shapes and sizes as conventional catalytic particles as shown in FIGS. 5A to 5G, a same handling as in conventional catalytic particles can be made. In addition, is brought out an effect that it can also be made to divert a reaction apparatus using a conventional catalyser to an activation apparatus of a substance, where an activation structural body of the present invention is applied.

In addition, as shown in FIGS. 6A to 6F, the particulate activation structural bodies (activation structural blocks) of the present invention having structures, for example, shown in FIGS. 5A to 5F can be formed on each core, which is at a center, as shown in oblique lines, composed of any of a material whose reactivity to particles of the present invention is little and a metal whose specific heat is high. Thus forming the activation structural bodies of the present invention, in some case is brought out any effect that the activation structural bodies of the present invention can be cheaply manufactured and heat exchanging with a treated substance can be easily performed by using a metal whose heat conductivity is high.

Thus a method for coating the activation structural body of the present invention on a core can be formed by a conventional known method, for example, a rotational movement fluidizing method and an atomization drying method.

(Manufacturing of Plate-Form Activation Structural Body)

Here will be described a manufacturing method of a plate-form activation structural body of the present invention.

(Manufacturing of Particles: Step A)

First, form particles composed of any of predetermined elements and fluorocarbon, which becomes a fundamental unit of the activation structural body. A forming method of the particles is as described before.

That is, for example, by a known method in a manufacturing field of catalytic particles such as the gas atomization method and the sol-gel method, form spherical particles, specifically true spherical ones.

(Antistatic Treatment: Step B)

Next, for a purpose of easily performing an arrangement of spacing of each particle, perform an antistatic treatment for the particles thus formed. That is, in some case the formed particles cannot be arranged at desired positions with each of the particles adhering or repelling due to static in arraying them. Therefore, perform the antistatic treatment by dispensing both of an anion/cation to the particles.

(Sintering Treatment: Step C)

Arrange the particles composed of any of the predetermined elements and fluorocarbon, where the antistatic treatment is dispensed, as shown in FIG. 1A, and perform a sinter molding into a predetermined shape. A sintering condition then is: a temperature not more than a meting temperature of any of the predetermined elements and the fluorocarbon composing applied particles, and a temperature where the sinter molding can be performed (for example, 1,200 to 1,300 degrees Celsius when using silicon); a sintering time of 2.5 to 3.5 hours; and a sintering pressure of 12 to 25 MPa. (Meanwhile, because the fluorocarbon is impossible to be directly sintered, a predetermined shape thereof is made, for example, by CIP (Cold Isostatic Press).) Thus performing the sinter molding, are obtained plate-form activation structural bodies, which have the array shown in FIG. 1B and shapes shown in FIGS. 3A to 3D. In addition, can also be obtained structures other than the plate-form activation structural bodies, that is, the particulate activation structural bodies (activation structural blocks) of the present invention having structures shown in FIGS. 5A to 5G.

There is a characteristic in performing the sinter molding without using a binder different from a normal sinter molding when forming any of the plate-form activation structural body and the activation structural body of the present invention. In other words, if performing the sinter molding using a conventional known binder, there is a possibility that: impurities deriving from the binder adhere to surfaces of particles, which impurities makes it difficult to make any of the plate-form activation structural body and the activation structural block with uniformly arranging the air gap S between each of the particles, that is, an energy concentration field; and thereby activation of the particles is lost. Of course, if the air gap S between the particles specified in the present invention can be arranged and an adherence of the impurities to the surfaces thereof can be prevented, it can also be made to perform the sinter molding with using the binder, and the manufacturing method of the present invention is not limited to whether or not the binder is used. The sintering temperature in using the binder is not less than a decomposition temperature of the binder.

Here will be described a hydrogen generation apparatus, which uses the plate-form activation structural body thus formed.

(Treated Substance)

As treated substances in the present invention, are used liquid compounds having hydrogen such as water, an aqueous medium, hydrogen peroxide, and an organic compound. The aqueous medium means to contain a composition, which is soluble and mixable into the water, for example, an electrolyte such as sodium chloride; a polar solvent such as lower alcohol; sugar such as saccharose; and a water solution, emulsion, and suspension liquid, which contain other various compositions. In addition, the organic compound is not specifically limited if when passed through between particles composing the activation structural body of the present invention, it alienates the hydrogen from bondings such as a C—H bonding and a C—OH bonding; the organic compound comprehends a wide range, for example, from aliphatic alcohol such as ethanol and methanol to mixtures of gasoline, petroleum ethers, and the like.

(Preparatory Treatment: Removal of Impurities, Heating, and the Like)

A liquid of such a treated-substance is appropriately selected, depending on a purpose. In addition, for example, when such impurities, which generate clogging for an energy concentration field in the activation structural body of the present invention, exist in the liquid of the treated substance, it is preferable to pass the treated substance through the activation structural body of the present invention after removing the impurities (for example, impurities such as sands and particulates existing in the sea water when using it) in advance by flocculation/precipitation, filtration, and the like. In addition, after heating the liquid by a heating means, it may also be passed through the activation structural body of the present invention, depending on a request.

Thus by making the water and the organic compound intervene between the energy concentration field (between the particles) in the activation structural body of the present invention, it can be made to give energy higher than bonding energy such as that of the C—H bonding and the C—OH bonding and to alienate hydrogen (H). The hydrogen thus alienated can be easily recovered as a hydrogen molecule ($H_2$) by a conventional known method.

EXAMPLES OF APPARATUSES

Examples of Plate-Form Activation Structural Bodies and Liquid Treatments

This embodiment is to describe examples where plate-form activation structural bodies, which are, for example, molded into the plate forms described in FIGS. 3A to 3D, are applied to hydrogen generation apparatuses. Here will be described the embodiment of the present invention, based on FIGS. 7A to 13.

The hydrogen generation apparatuses shown in FIGS. 7A to 13, where the activation structural bodies (of the present invention) are filled, are apparatuses for activating fluids with using the plate-form activation structural bodies, respectively; and in the hydrogen generation apparatuses some heating means are preparatorily dispensed.

As shown in FIG. 7A to 13, each of the hydrogen generation apparatuses of the present invention is mainly constituted of a treated-substance bath 2 for treating a treated substance where plate-form activation structural bodies I are provided.

Figure 7A:
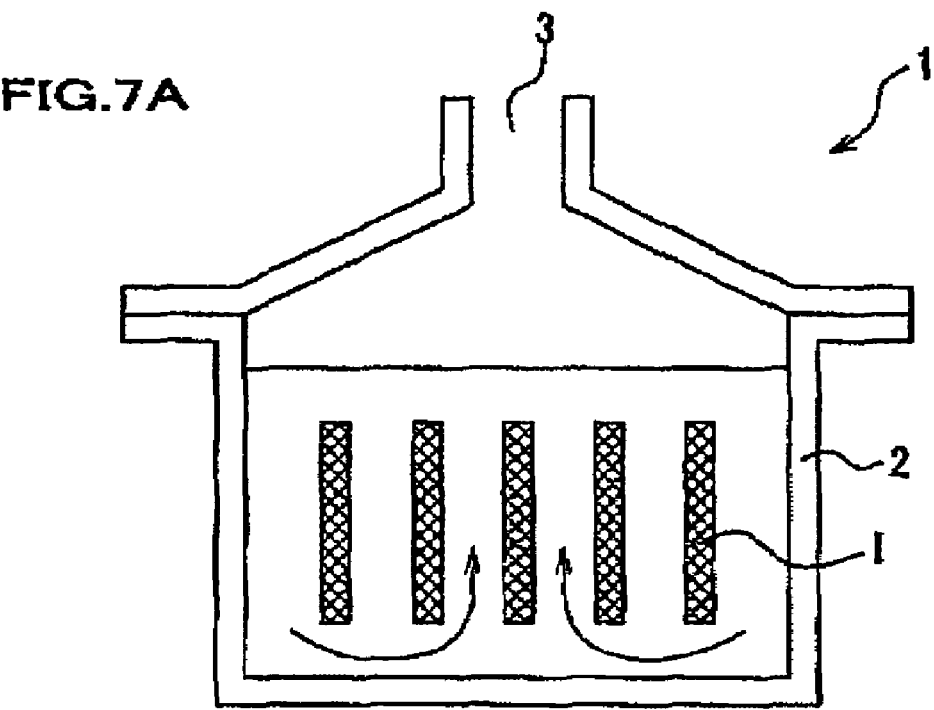
FIGS. 7A and 7B are sectional views showing each example of hydrogen generation apparatuses that fill activation structural bodies of the present invention.
Figure 7B:
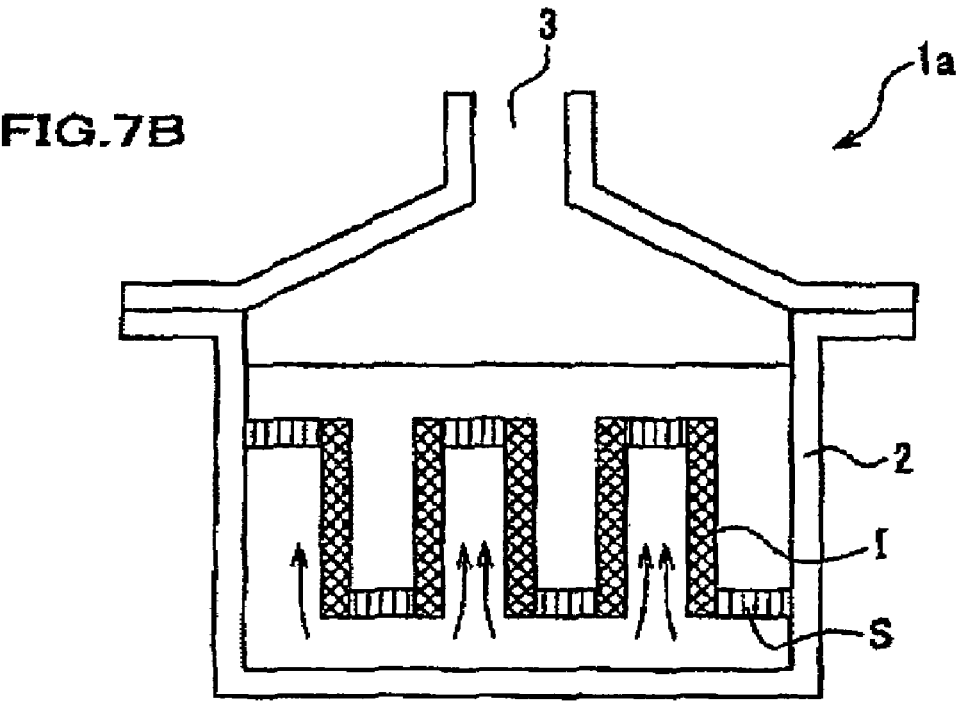

The hydrogen generation apparatuses shown in FIGS. 7A and 7B are activation apparatuses of fundamental structures for treating each liquid of treated substances by the plate-form activation structural bodies I of the present invention: A hydrogen generation apparatus 1 shown in FIG. 7A shows one embodiment of the present invention, where the plate-form activation structural bodies I are vertically arranged within the treated-substance bath 2; A hydrogen generation apparatus 1a shown in FIG. 7B shows another embodiment of the present invention, where the plate-form activation structural bodies I are provided so as to vertically compartmentalize the treated-substance bath 2 in an up/down direction. The hydrogen generation apparatuses 1 and 1a shown in FIGS. 7A and 7B are apparatuses where gas generations are assumed to be mainly accompanied in activating each of the treated substances therein.

The hydrogen generation apparatus 1 shown in FIG. 7A shows one example of the hydrogen generation apparatus that arranges the activation structural bodies along a sectional longitudinal direction of the plate-form activation structural bodies I and activates a treated substance by making itself pass through and stay in an energy concentration field of the activation structural bodies; on the other hand, the hydrogen generation apparatus 1a shown in FIG. 7B shows another example of the hydrogen generation apparatus that arranges the activation structural bodies at positions, where a treated substance is made to pass through insides of the plate-form activation structural bodies I in a sectional longitudinal direction thereof, and activates the treated substance by making itself pass through and stay in an energy concentration field of the activation structural bodies.

(Vertical Arrangement)

The hydrogen generation apparatus 1 shown in FIG. 7A has a constitution where a plurality of the plate-form activation structural bodies I (I-shape) of the present invention are arranged in parallel with the treated-substance bath 2. For example, when activating a fluid and thereby discharging gases, the treated-substance bath 2 has an outlet 3 of the gases. And for example, when using water as a liquid of a treated substance, activating the water by an energy concentration field in the plate-form activation structural bodies I of the present invention, and generating gases containing hydrogen, first the water invading the energy concentration field in the plate-form activation structural bodies I is activated and thereby the gases are generated. The generation gases do not stay in the energy concentration field, but they float upward as bubbles. By repetitions thereof is generated convection of the treated substance shown in arrow marks of FIG. 7A. And a constitution is designed so that the bubbles, which are discharged when the liquid is activated by the plate-form activation structural bodies I, do not stay in the energy concentration field of the plate-form activation structural bodies I for a long period but can swiftly float by the convection of the liquid thus generated. Meanwhile, having analyzed compositions of the generation gases, they are hydrogen, oxygen, and nitrogen.

Thus by making the constitution so that the activation structural bodies are arranged along the sectional longitudinal direction of the plate-form activation structural bodies and the treated substance is passed through and stayed in the energy concentration field of the activation structural bodies, the liquid of the treated substance can be made to be efficiently activated.

(Compartmentalization of Up/Down)

On the other hand, the hydrogen generation apparatus 1a shown in FIG. 7B has a constitution, where the treated-substance bath 2 is compartmentalized in an up/down direction by the plate-form activation structural bodies I.

Although in order to compartmentalize the treated-substance bath 2 in the up/down direction, it is a simplest constitution to provide one plate-form activation structural body I in parallel with a bottom face of the treated-substance bath 2 and to compartmentalize the treated-substance bath 2 (not shown), it is preferable from a viewpoint of making the treated substance described before to make a constitution so that the treated-substance bath 2 is compartmentalized in the up/down direction by the plate-form activation structural bodies I and at the same time they are arranged in a vertical direction for the treated-substance bath 2.

The hydrogen generation apparatus 1a shown in FIG. 7B has the constitution, where the treated-substance bath 2 is compartmentalized in the up/down direction by the plate-form activation structural bodies I and at the same time the plate-form activation structural bodies I are arranged in the vertical direction for the treated-substance bath 2. That is, the hydrogen generation apparatus 1a has a constitution of blocking off a horizontal plane of the treated-substance bath 2 with plate-form activation structural bodies S of an S-shape or the plate-form activation structural bodies I of an I-shape, plate-form activation structural bodies L of an L-shape, and plate-form activation structural bodies U of a U-shape by combining them (hereinafter the activation structural bodies in such the hydrogen generation apparatus 1a are totally referred to as activation structural body S). When same as the hydrogen generation apparatus 1 shown in FIG. 7A, the hydrogen generation apparatus 1a thus constituted and shown in FIG. 7B uses, for example, water as a liquid of a treated substance, activates the water by an energy concentration field in the activation structural body S of the present invention, and generates gases containing hydrogen, first the water invading the energy concentration field in the activation structural body S is activated and then the gases are generated. The generation gases do not stay in the energy concentration field but float upward as bubbles. By repetitions thereof is generated a convection of the treated substance shown in arrow marks of FIG. 7B.

In addition, because the activation structural body S compartmentalizes the up/down direction of the treated-substance bath 2, that is, the horizontal plane, the bubbles generated by the treated substance are designed so as to certainly pass through the activation structural body S and float. Thus constituted, increases a probability, where the liquid of the treated substance invades the energy concentration field in the activation structural body S, and thereby an activation speed (reaction speed) increases.

Application Example 1

Heating of Activation Structural Body

Here will be described preferred embodiments of the hydrogen generation apparatuses having such the fundamental constitution, using FIGS. 7A to 13. Meanwhile, in descriptions of application examples below, for a description in common to the hydrogen generation apparatus 1 having the constitution shown in FIG. 7A and the hydrogen generation apparatus 1a having the constitution shown in FIG. 7B, the former having the constitution shown in FIG. 7A is mainly described and the description of the latter shown in FIG. 7B is omitted.

Figure 8:
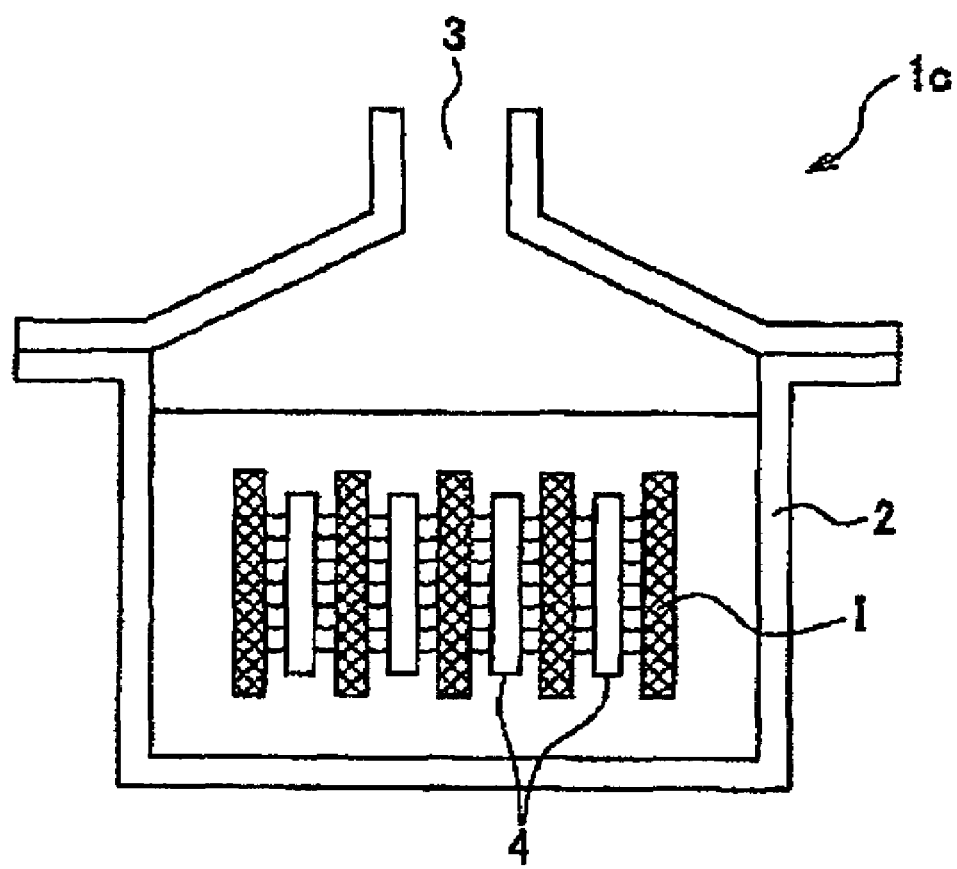
FIG. 8 is a sectional view showing another example of a hydrogen generation apparatus that uses activation structural bodies of the present invention.

A hydrogen generation apparatus 1c shown in FIG. 8 is an apparatus of a constitution where convection of a treated substance is positively generated by heating the treated substance. The hydrogen generation apparatus 1c can handle both of the hydrogen generation apparatus 1, which arranges the plate-form activation structural bodies I along a sectional longitudinal direction thereof, and the hydrogen generation apparatus 1a, which activates the treated substance by making itself passing through the activation structural bodies S shown in FIG. 7B. That is, each of the hydrogen generation apparatuses 1 and 1a shown in FIGS. 7A and 7B convects a treated substance in a so called natural generation by gas generation accompanying activation of the treated substance; whereas, the apparatus 1c is designed so as to positively generate convection by heating plate-form activation structural bodies (and the treated substance).

The hydrogen generation apparatus 1c shown in FIG. 8 is constituted of the treated-substance bath 2, which arranges a plurality of the plate-form activation structural bodies I in parallel and provides heating elements of heating means 4 with distances therein between the plate-form activation structural bodies I, respectively. Meanwhile, numbers of the plate-form activation structural bodies I and the heating elements of the heating means 4 are not specifically limited and are appropriately selected, depending on a kind of the treated substance, a volume of the treated-substance bath 2, and the like.

Thus constituted, radiation heat of the heating elements of the heating means 4 is transferred to the treated substance of a fluid existing in vicinity of the heating elements and thereby convection of the treated substance is generated. And thus the convection of the treated substance being generated, a probability, where the treated substance passes through an energy concentration field (not shown) in the plate-form activation structural bodies I, increases and thereby the activation of the treated substance is accelerated.

Figure 14:
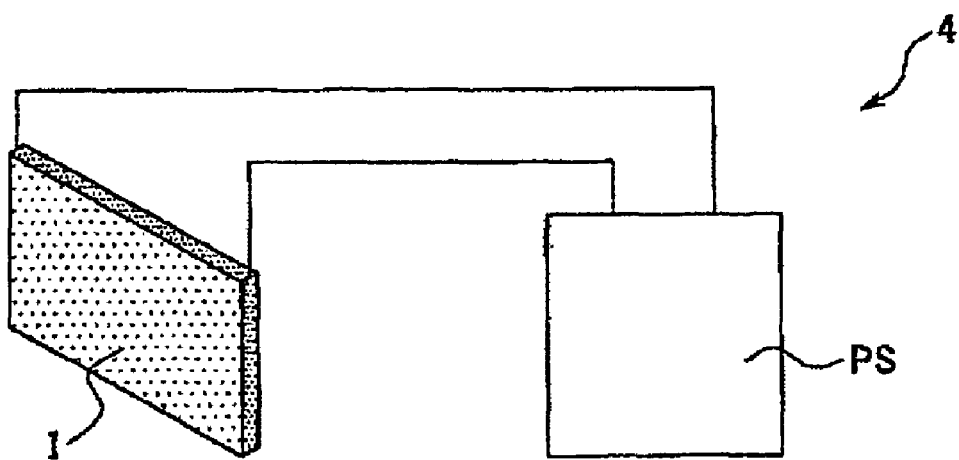
FIG. 14 is a perspective view showing one example of a method for directly heating an activation structural body applied to the present invention.
Figure 15:
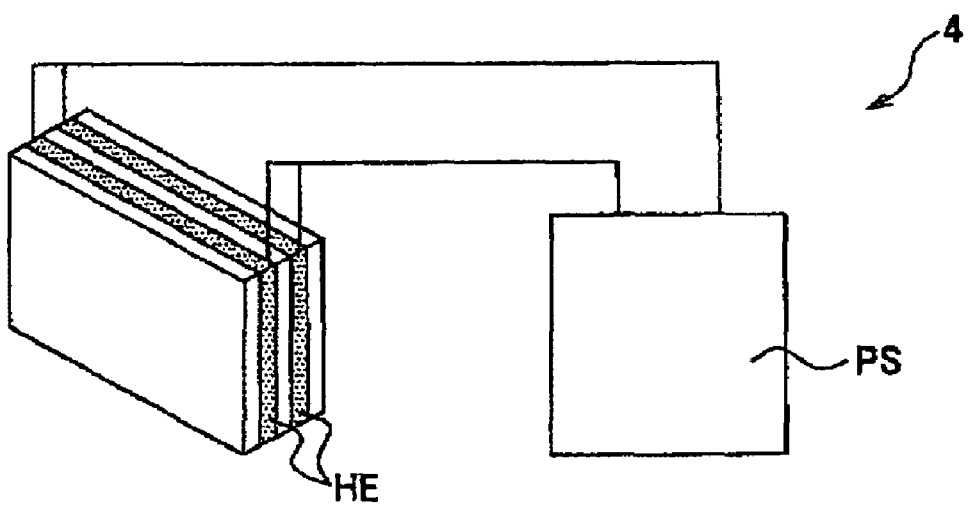
FIG. 15 is a perspective view showing another example of a method for directly heating activation structural bodies applied to the present invention.

Heating examples of the plate-form activation structural bodies I by such the heating means shown in FIGS. 14 and 15.

That is, FIG. 14 is a perspective view showing one example of directly heating a plate-form activation structural body of the present invention; FIG. 15 is a perspective view showing another example of directly heating plate-form activation structural bodies of the present invention.

As shown in FIG. 14, the heating means 4 for heating the plate-form activation structural body I is designed to heat it by dispensing a different-kind conductive metal-plating treatment thereto and applying a voltage to the body I with a power source PS through conducting wires. Although a film thickness of the different-kind conductive metal-plating then is appropriately selected in a range where action of an activation structural body is not impeded, for example, the thickness is in a range of 3 μm to 5 μm. Particularly, a partial plating method is effective for a heat generation.

Meanwhile, for example, the heating means 4 shown in FIG. 14 may be dispensed to all of five plate-form activation structural bodies I shown in FIG. 8; otherwise, the heating means 4 may also be partially dispensed, for example, to every other thereof. In addition, when dispensing the heating means 4 shown in FIG. 14 to a plurality of plate-form activation structural bodies I, all of the plate-form activation structural bodies I may be connected in parallel and in series through conducting wires, and a voltage may be applied from one power source; otherwise, all of the plate-form activation structural bodies I may also be connected to separate power sources, respectively.

Thus constituted, a heat generation amount of the plate-form activation structural bodies I can be freely controlled by controlling the voltage from the power source. Because the convection of the treated substance becomes controllable by thus freely changing the heat generation amount, the activation speed of the treated substance becomes adjustable. In addition, control of the activation speed of the treated substance is easy, compared to the hydrogen generation apparatuses 1 and 1a shown in FIGS. 7A and 7B where the convection is naturally generated.

The heating means 4 shown in FIG. 15 is designed so that heating elements HE are provided between each of the plate-form activation structural bodies I.

The heating elements HE are indispensable to be porous in order that a treated substance is efficiently passed through an energy concentration field in the plate-form activation structural bodies I. Such the porous heating elements HE can be selected from known ones as various kinds of ceramic heating elements.

Because the convection of the treated substance becomes controllable by thus freely controlling the heat generation amount, the activation speed of the treated substance becomes adjustable. In addition, the control of the activation speed of the treated substance is easy, compared to the hydrogen generation apparatuses 1 and 1a shown in FIGS. 7A and 7B where the convection is naturally generated.

Meanwhile, each of the heating means 4 shown in FIGS. 14 and 15 can bring out a same effect by providing a same constitution for plate-form activation structural bodies of the vertical direction out of the plate-form activation structural bodies of the hydrogen generation apparatus 1a shown in FIG. 7B.

Application Example 2

Indirect Heating of Activation Structural Body

Figure 9A:
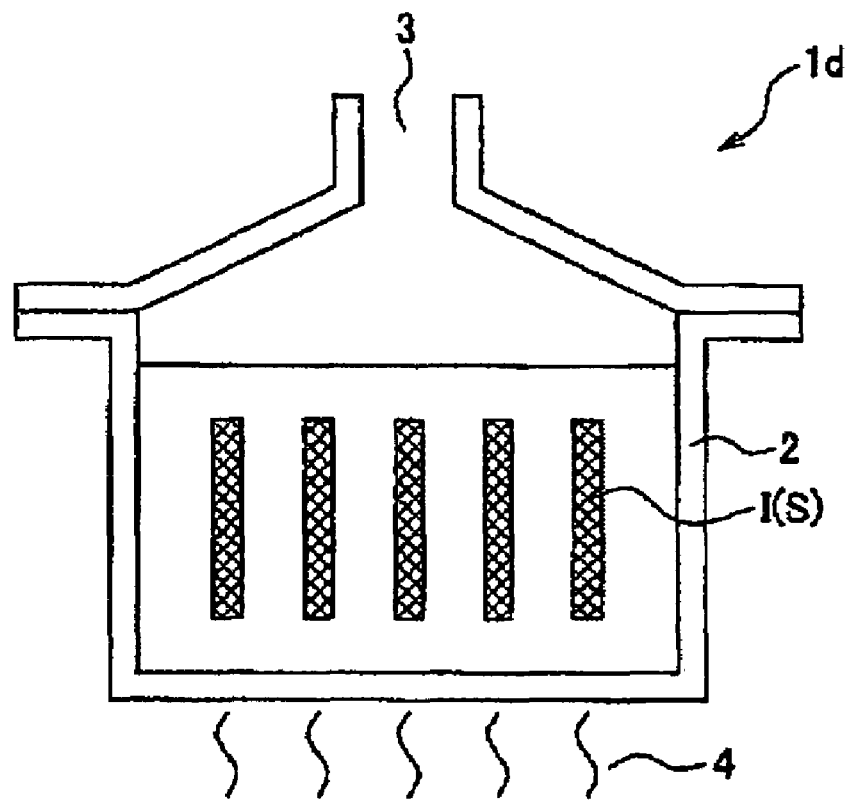
FIGS. 9A and 9B are sectional views showing each of still other examples of hydrogen generation apparatuses that use activation structural bodies of the present invention.
Figure 9B:
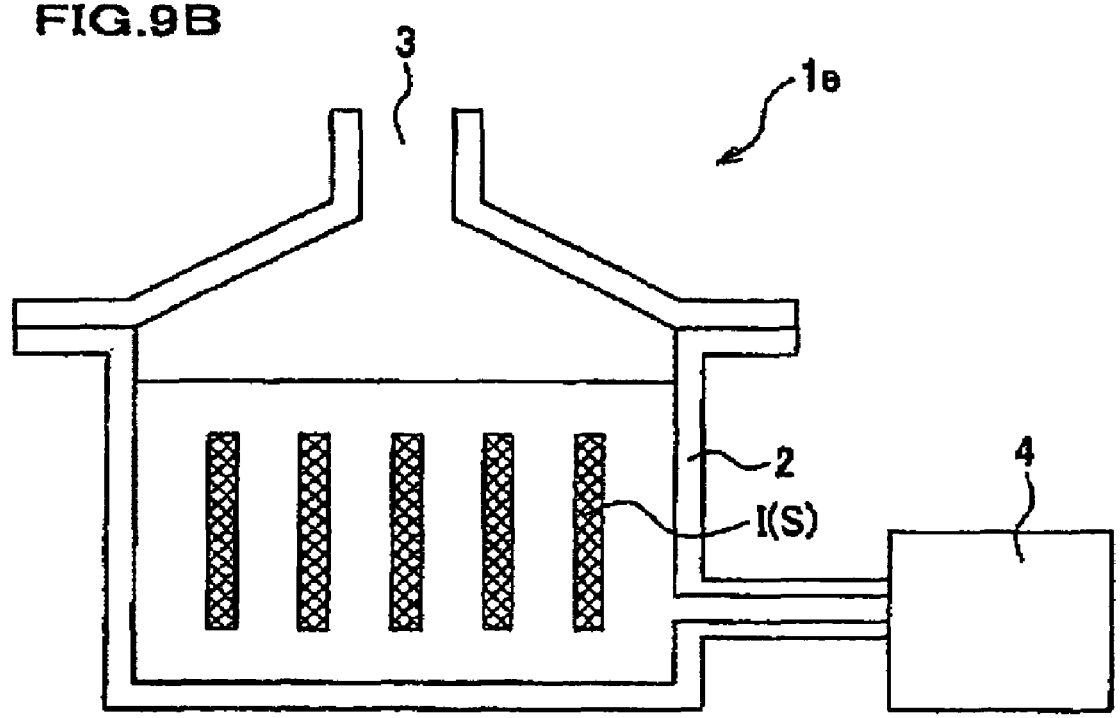

Each of hydrogen generation apparatuses shown in FIGS. 9A and 9B is constituted of the treated-substance bath 2, which arranges the plate-form activation structural bodies I (S) of the present invention; and the heating means 4, which heats a treated substance in the treated-substance bath 2 from an outside.

A hydrogen generation apparatus 1d shown in FIG. 9A is one example of a constitution, where the heating means 4 are arranged with making themselves contact the treated-substance bath 2. For example, other than the constitution shown, a heating means may be provided at a side face of the treated-substance bath 2; otherwise, a heating means, for example, a heat medium tube may be provided so as to cover all faces of the treated-substance bath 2. In addition, a hydrogen generation apparatus 1e shown in FIG. 9B has a constitution, which provides an external heater of the heating means 4 with integrally molding it together with the treated-substance bath 2. The constitution is a same type, for example, as a system of heating water within a bath by a gas iron pot.

Different from the hydrogen generation apparatus 1c shown in FIG. 8 that directly heats the plate-form activation structural bodies I, each of the hydrogen generation apparatuses 1d and 1e shown in FIGS. 9A and 9B is a system of indirectly heating the plate-form activation structural bodies I by heating a treated substance. Thus constituted, same as the hydrogen generation apparatus 1c shown in FIG.8, convection of the treated substance is generated within the treated-substance bath 2. And the convection of the treated substance being generated, a probability where the treated substance passing through an energy concentration field (not shown) in the plate-form activation structural bodies I of the present invention increases and thereby the activation of the treated substance is accelerated.

Meanwhile, because control of the convection of the treated substance can be made by controlling a heat generation amount of a heating element, the activation speed of the treated substance becomes more easily adjustable same as in the example shown in FIG. 8.

Application Example 3

Up/Down Directional Movement of Activation Structural Body

Figure 10A:
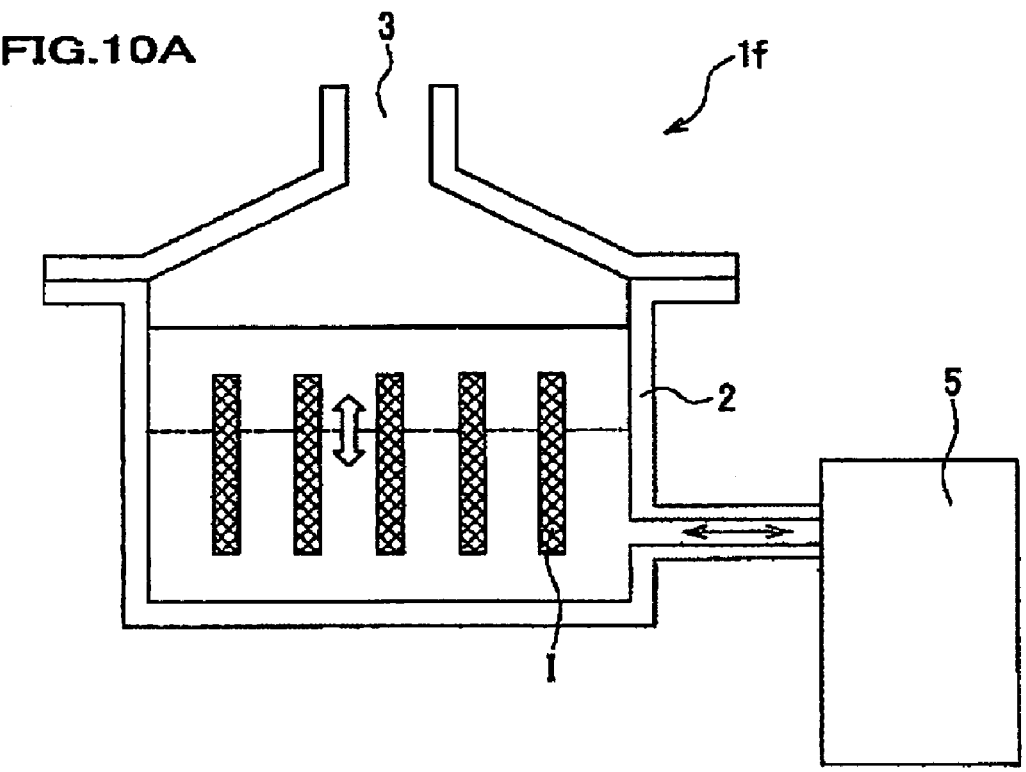
FIGS. 10A and 10B are sectional views showing each of yet other examples of hydrogen generation apparatuses that use activation structural bodies of the present invention.

A hydrogen generation apparatus 1f shown in FIG. 10A is an apparatus, which activates a treated substance and has a constitution of changing a relationship between relative height positions of the plate-form activation structural bodies I (S) and any liquid level of water and an aqueous medium within the treated-substance bath 2. By thus changing the relationship between the relative height positions of the plate-form activation structural bodies I (S) and any liquid level of the water and the aqueous medium, a contact area of a liquid of the treated substance and the plate-form activation structural bodies I is changed. That is, an activation speed is adjusted by changing a reaction volume.

This type of hydrogen generation apparatuses can take two kinds of constitutions, roughly divided. That is, FIG. 10A is a system of the hydrogen generation apparatus 1f that integrally molds an external tank 5 with the treated-substance bath 2 and changes the liquid level of the treated substance by the external tank 5. In the hydrogen generation apparatus 1f shown in FIG. 10A the external tank 5 changes a liquid amount (volume) within the treated-substance bath 2 by a liquid amount adjustment means (liquid amount adjustment valve and the like) not shown. Thus the liquid amount changing, the contact area of the plate-form activation structural bodies I and the liquid of the treated substance changes. In other words, an immersion amount of the plate-form activation structural bodies I in the treated substance changes. Thus an absolute amount of the liquid of the treated substance results in changing, wherein the treated substance invades an energy concentration field (not shown) in the plate-form activation structural bodies I.

Figure 10B:
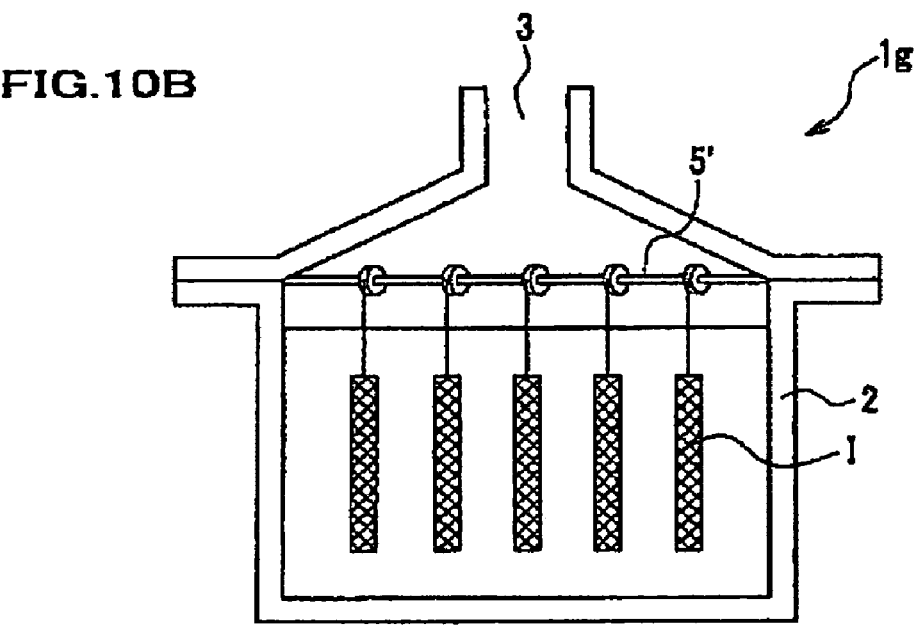

A hydrogen generation apparatus 1g shown in FIG. 10B is constituted so as to move the plate-form activation structural bodies I in a vertical direction (height direction) by a vertical direction movement means 5' connected to each of the plate-form activation structural bodies I instead of the external tank 5 in FIG. 10A.

Different from the hydrogen generation apparatus 1f shown in FIG. 10A having the constitution of changing the volume of the liquid of the treated substance, the hydrogen generation apparatus 1g shown in FIG. 10B changes the contact area of the plate-form activation structural bodies I and the liquid of the treated substance by directly moving the plate-form activation structural bodies I in the vertical direction by the vertical direction movement means 5'. Same as the hydrogen generation apparatus 1f shown in FIG. 10A, the hydrogen generation apparatus 1g has a constitution of controlling a activation speed of the treated substance by a change of the contact area of the liquid and the plate-form activation structural bodies I.

When as shown in FIGS. 10A and 10B, each the constitution is made to change a relative contact area of the plate-form activation structural bodies I and the liquid of the treated substance, it has an advantage that the activation of the treated substance can be stopped by completely separating the plate-form activation structural bodies I and the liquid of the treated substance.

Figure 11:
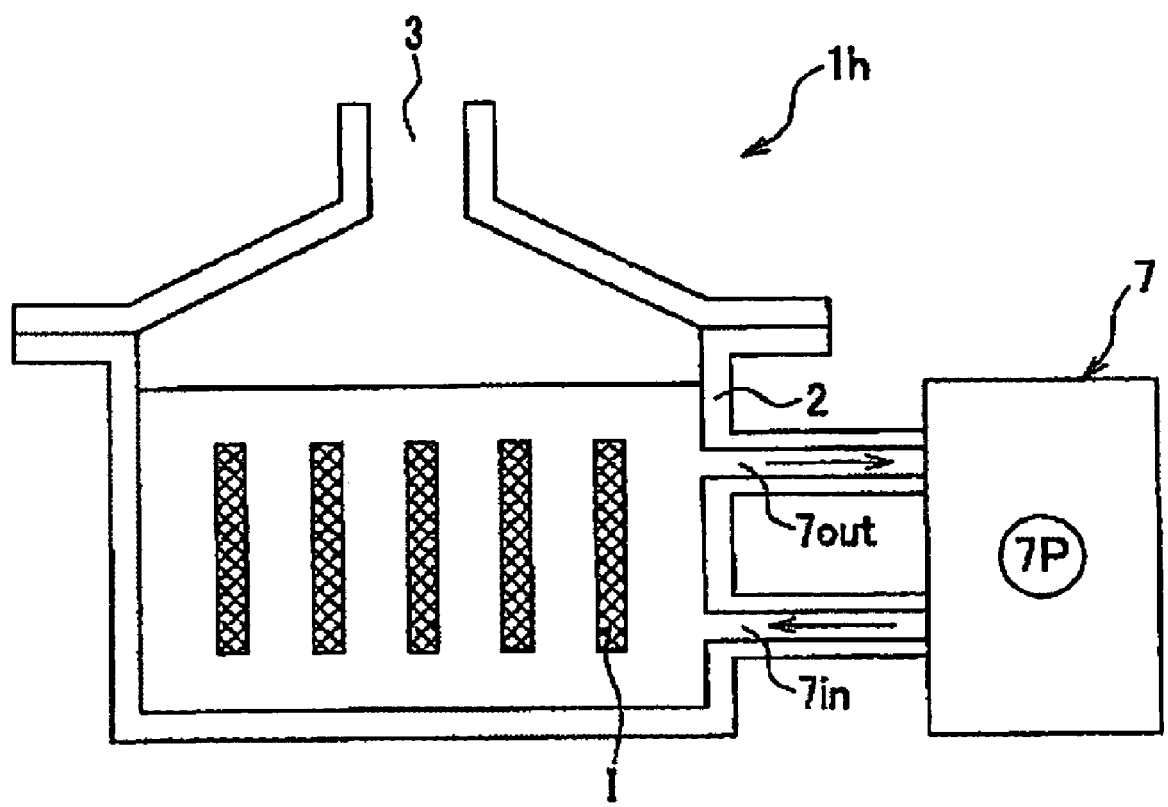
FIG. 11 is a sectional view showing yet still another example of a hydrogen generation apparatus that uses activation structural bodies of the present invention.
Figure 12A:
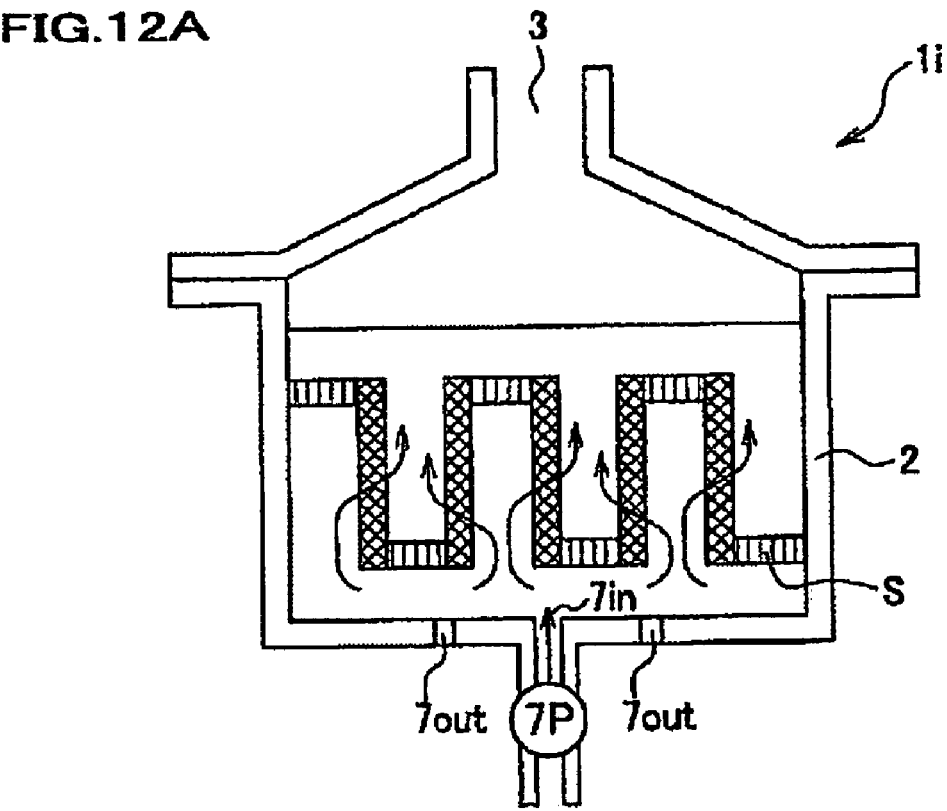
FIGS. 12A and 12B are sectional views showing each of further other examples of hydrogen generation apparatuses that use activation structural bodies of the present invention.
Figure 12B:
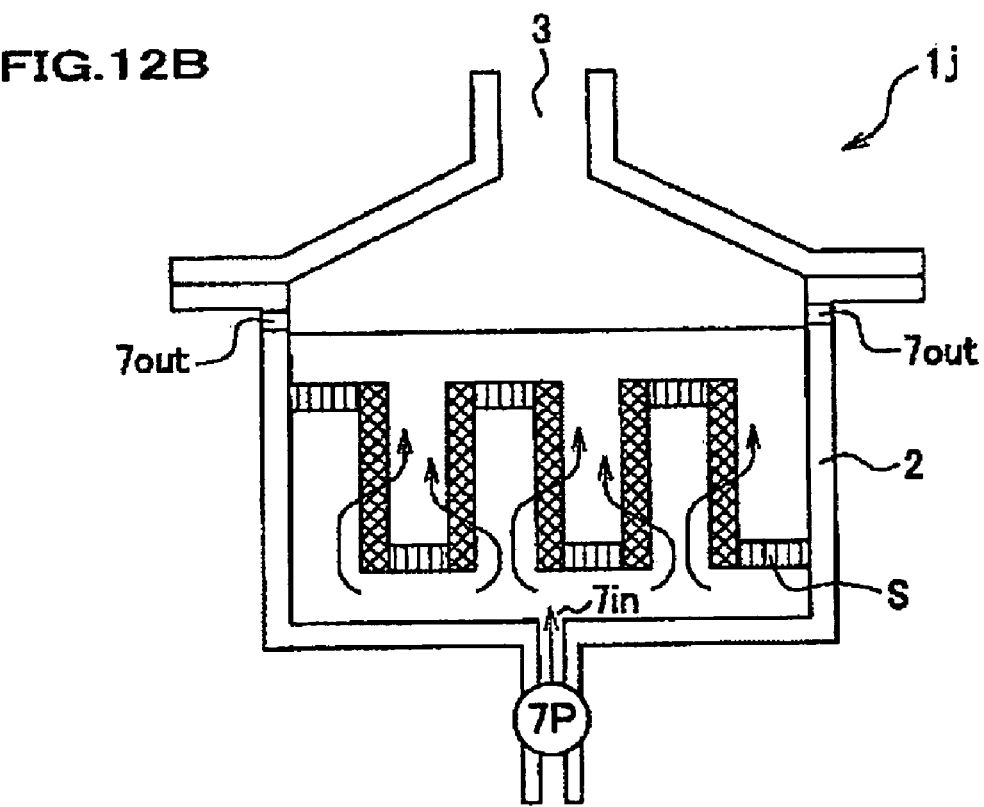

Each of hydrogen generation apparatuses 1h to 1j shown in FIGS. 11 to 12B is an apparatus that provides a circulation means for circulating a liquid of a treated substance and thereby forcibly circulate the treated substance.

The hydrogen generation apparatus 1h shown in FIG. 11 has a constitution, where the circulation means is further provided at a side face of the treated-substance bath 2 in any of the hydrogen generation apparatuses 1 and 1a of the present invention shown in FIGS. 7A and 7B. The hydrogen generation apparatus 1h shown in FIG. 11 is an example where the circulation means is, for example, constituted of a circulation pump 7P, a treated-substance inlet 7in, and a treated-substance outlet 7out. Thus constituted, the treated substance, which comes in from the inlet 7in positioned at a lower side of the side face of the treated-substance bath 2 as shown in an arrow mark, is pressurizedly sent by the circulation pump 7P and discharged at a predetermined speed from the outlet 7out positioned at an upper side of the side face of the treated-substance bath 2.

A forcible convection of the treated substance occurs by a flow thereof thus caused by the circulation means. Because a degree of the convection is adjustable according to a pressurized sending speed by the circulation pump 7P, the activation speed of the treated substance becomes adjustable, depending on a desired activation speed.

Each of hydrogen generation apparatuses 1i and 1j shown in FIGS. 12A and 12B has a constitution where the pump 7P, which is a main body of the circulation means, is provided at a bottom portion of the treated-substance bath 2. And the hydrogen generation apparatus 1i shown in FIG. 12A provides outlets 7out of a treated substance at the bottom portion of the treated-substance bath 2; the hydrogen generation apparatus 1j shown in FIG. 12B provides outlets 7out of discharge ports of a treated substance at an upper side of a side face of the treated-substance bath 2.

The hydrogen generation apparatus 1i shown in FIG. 12A arranges the pump 7P at a center of the bottom portion of the treated-substance bath 2 and provides a plurality of the outlets 7out at a periphery of the pump 7P. Thus constituted, a fluid of the treated substance pressurizedly sent from the pump 7P is uniformly diffused within the treated-substance bath 2.

The hydrogen generation apparatus 1j shown in FIG. 12B arranges the pump 7P at a center of the bottom portion of the treated-substance bath 2 and has at least one outlet 7out of the treated substance at a predetermined place of the side face of the treated-substance bath 2, that is, at an arbitrary place higher than an interface of the treated substance. And a fluid of the treated substance pressurizedly sent from the pump 7P is constituted to be sent upward at a predetermined flow rate, overflow from the outlet 7out provided at the upper side of the treated substance, and flow out. Thus constituted, same as in the hydrogen generation apparatus 1i shown in FIG. 12A, also in the hydrogen generation apparatus 1j shown in FIG. 12B the liquid of the treated substance pressurizedly sent from the pump 7P is uniformly diffused within the treated-substance bath 2.

Thus each of the hydrogen generation apparatuses 1i and 1j, which has the pump 7P of the circulation means at the bottom portion of the treated-substance bath 2 shown in FIGS. 12A and 12B, can not only heighten the activation speed of the treated substance but also adjust it by adjusting a flow amount of the treated substance by the pump 7

Meanwhile, each of the hydrogen generation apparatuses 1i and 1j, which has the pump 7P of the circulation means at the bottom portion of the treated-substance bath 2 shown in FIGS. 12A and 12B, is especially preferable to be applied to the hydrogen generation apparatus 1a shown in FIG. 7B, that is, a hydrogen generation apparatus having a constitution, where a treated substance comes across an inside of the activation structural bodies S and is activated.

Figure 13:
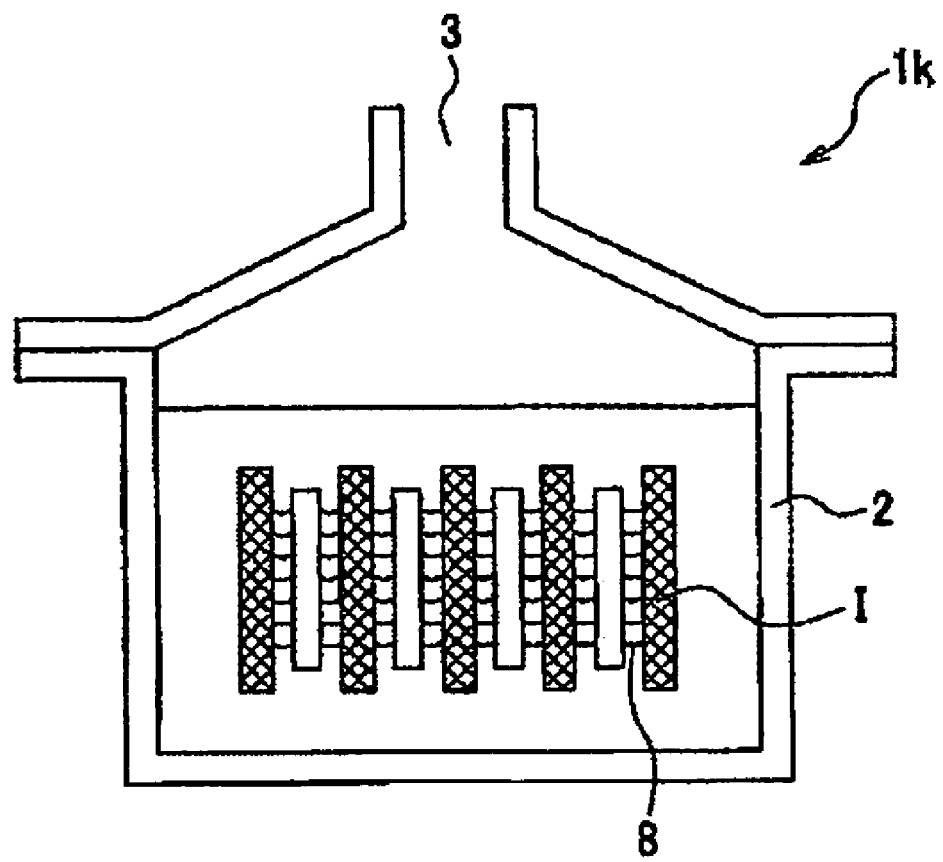
FIG. 13 is a sectional view showing further still another example of a hydrogen generation apparatus that uses activation structural bodies of the present invention.

A hydrogen generation apparatus 1k shown in FIG. 13 has a constitution where oscillators 8 are provided in parallel in a vertical direction of the plate-form activation structural bodies I (plate-form activation structural bodies S) in the hydrogen generation apparatus 1 shown in FIG. 7A.

By providing the oscillators 8 and applying a predetermined oscillation through the oscillators 8 to the plate-form activation structural bodies I, it can be made to efficiently lead a treated substance existing in the vicinity of and within the plate-form activation structural bodies I to an energy concentration field in the plate-form activation structural bodies I and to efficiently activate the treated substance. Particularly, the treated substance staying within the plate-form activation structural bodies I and especially bubbles generated by a treatment can be discharged.

Thus, although using FIGS. 7A to 13, is described each of the hydrogen generation apparatuses whose treated substance is mainly a liquid, it is also within a range of the present invention to combine these technologies. That is, for example, each of the hydrogen generation apparatuses 1 and 1a, which has the fundamental constitutions shown in FIGS. 7A and 7B, can also be constituted so as to have both of the heating means 4 and the circulation means 7.

In addition, each of the hydrogen generation apparatuses 1 and 1a can also provide any of the particulate activation structural bodies shown in FIG. 5A to 6F and activation structural blocks having predetermined shapes as a fluidized bed at any of a lower portion and upper portion of the treated-substance bath 2.

(Hydrogen Separation)

Gases, which contain hydrogen thus generated by each of the hydrogen generation apparatuses 1 to 1k described in FIGS. 7A to 13, mainly contain impurity gases such as oxygen and nitrogen other than the hydrogen, depending on an applied treated substance. Accordingly, theses impurity gases are requested to be separated/removed. Here will be described a method for singly separating the hydrogen from gases containing it, using FIGS. 16 to 18.

Figure 16:
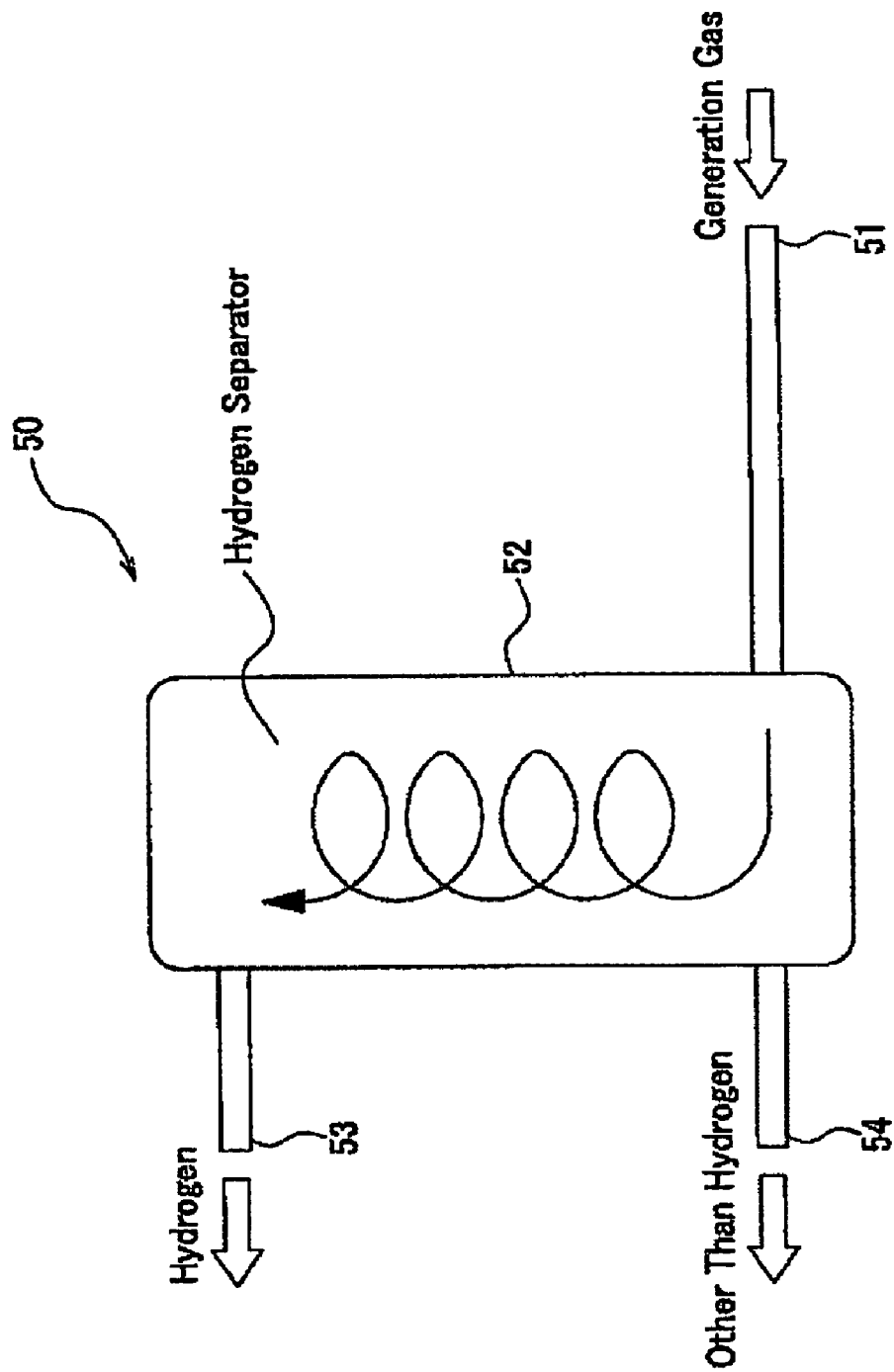
FIG. 16 is a sectional view showing one example of a gas separator for separating hydrogen from gases containing the hydrogen generated by a hydrogen generation apparatus of the present invention.
Figure 17:
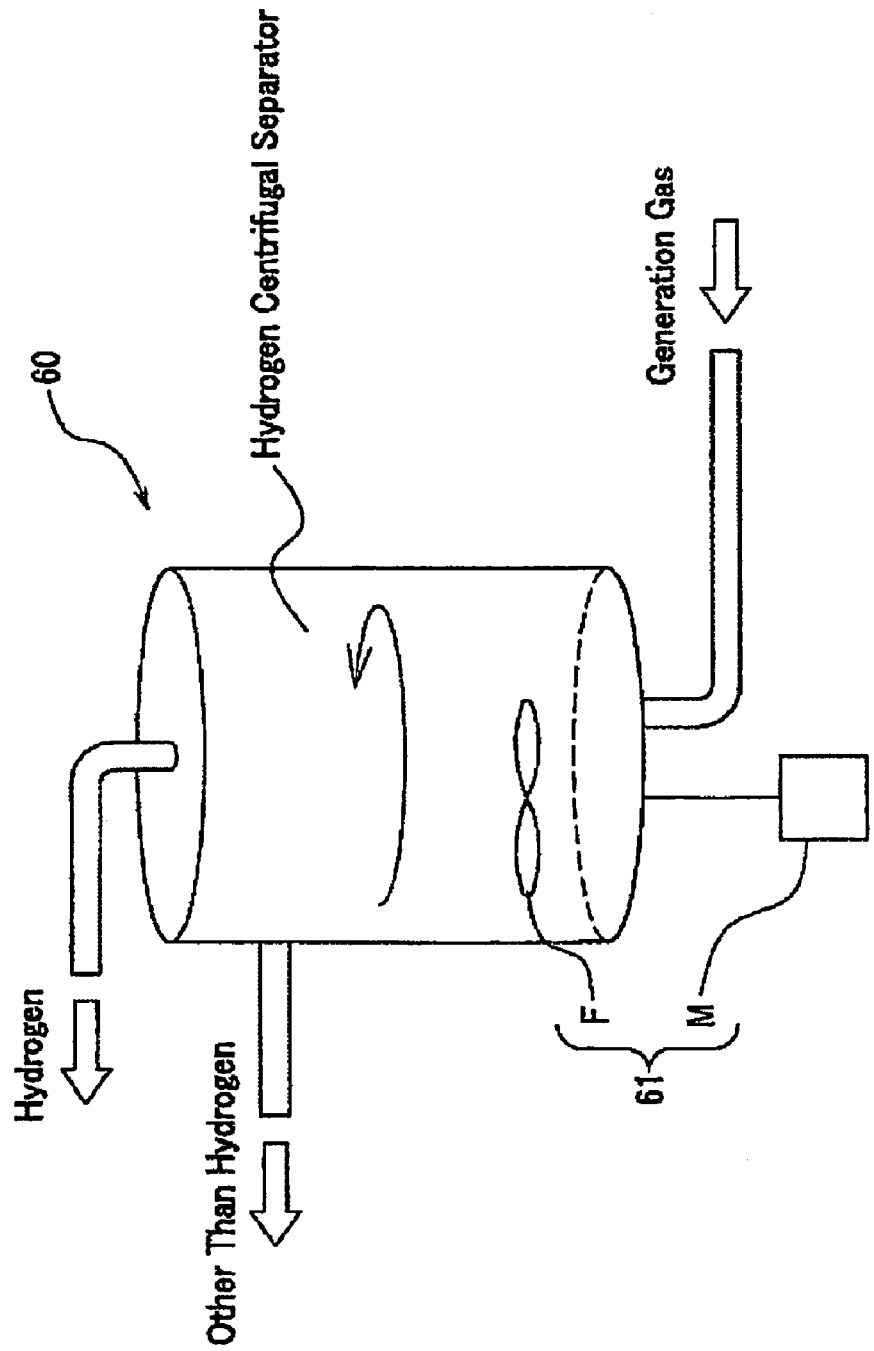
FIG. 17 is a sectional view showing another example of a gas separator for separating hydrogen from gases containing the hydrogen generated by a hydrogen generation apparatus of the present invention.
Figure 18:
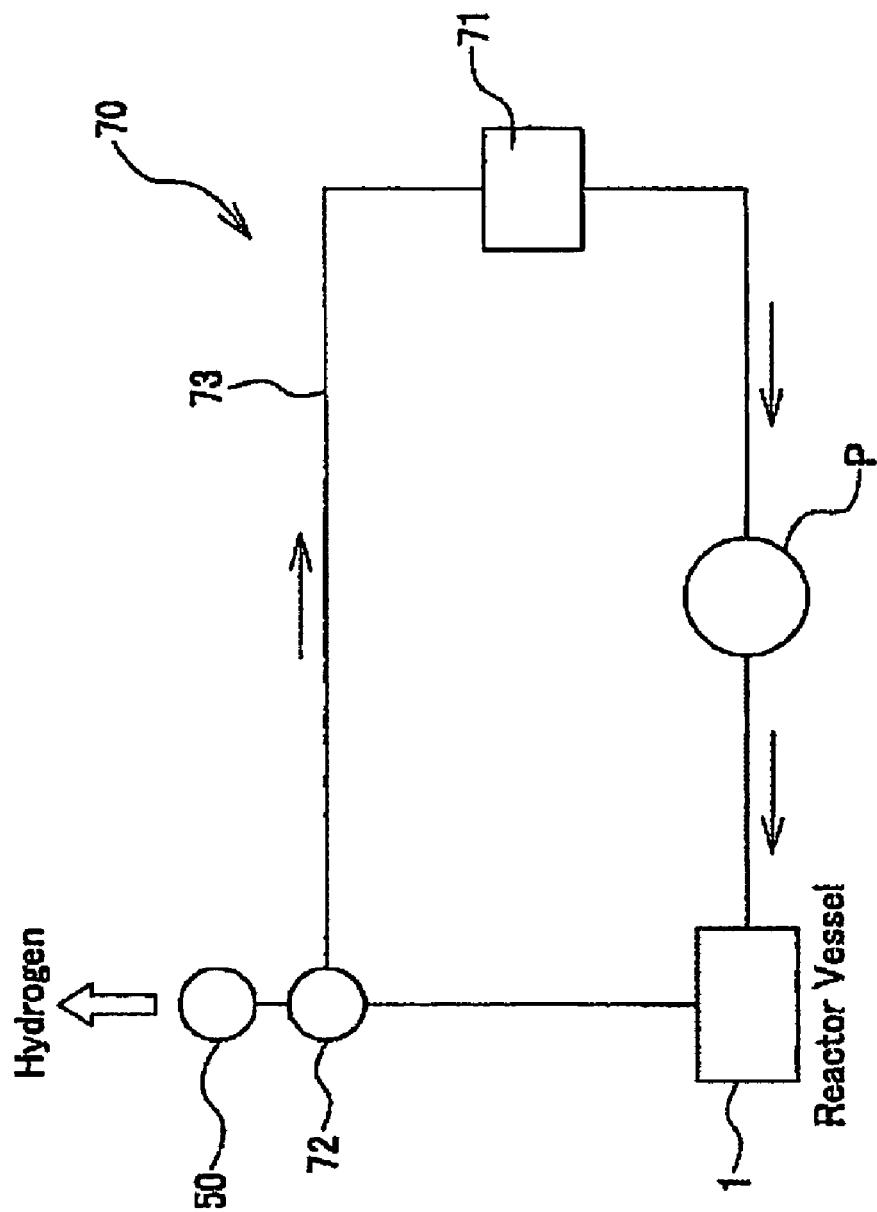
FIG. 18 is an outline constitution drawing of a hydrogen generation system of the present invention.

FIGS. 16 and 17 are sectional views showing each example of gas separators for singly separating hydrogen from gases containing it, which is generated by the hydrogen generation apparatuses of the present invention, and FIG. 18 is a schematic drawing showing one example of a hydrogen separation system where one of the gas separators is provided.

A gas separator 50 shown in FIG. 16 is constituted of a leading port 51 for leading gases, which are generated by the hydrogen generation apparatuses 1 and 1k shown in FIGS. 7A to 13, from a gas outlet 3; a main body 52 for separating the led gases into hydrogen and other gases; a hydrogen outlet 53 that is provided at an upper side of a side face of the main body 52 and recovers the hydrogen singly separated; and a discharge port 54 that is provided below the hydrogen outlet 53.

Gases, which are led to the leading port 51 and the main body 52 at a predetermined speed, generate a spiral flow shown in an arrow mark in FIG. 16. Here, because hydrogen is a light gas in specific gravity, the hydrogen in the gases led from the leading port 51 is discharged from the upper side of the side face of the main body 52. On the other hand, because gases other than hydrogen are heavy, compared to the hydrogen, they are discharged from the discharge port 54 below. Thus high concentration hydrogen can be recovered from the gases generated by the hydrogen generation apparatuses of the present invention.

A gas separator 60 shown in FIG. 17 has a constitution where a centrifugal separator 61 is provided in the main body 52 of the gas separator 50 shown in FIG. 16. The centrifugal separator 61 is constituted of a fan F for agitation and a motor M for driving the fan F.

And by rotating the fan F at a predetermined speed, hydrogen and other gases can be separated at a high speed.

Out of the hydrogen generation apparatuses thus described, will be described, based on FIG. 18, one example of a fundamental constitution of a hydrogen generation system 70, where the gas separator 50 is provide at a downstream of one of the hydrogen generation apparatuses 1 to 1k of the present invention shown in FIGS. 7A to 13.

As shown in FIG. 18, the hydrogen generation system 70 of the present invention is roughly constituted of a filter 71 for removing impurities such as dust existing in a treated substance; a pump P for circulating the treated substance; the hydrogen generation apparatus 1 (see FIGS. 7A to 13) of the present invention for generating gases containing hydrogen from the treated substance; a gas/liquid separator 72 for separating the treated substance (containing gases and a liquid), which is activated by the hydrogen generation apparatus 1, into the gases and the liquid; and the gas separator 50 for separating the gases, which are separated by the gas/liquid separator 72 into hydrogen and other gases. And the liquid separated by the gas/liquid separator 72 is returned to the filter 71 through a piping 73. Thus the hydrogen generation system 70 of the present invention forms a circulation system.

First, the treated substance such as water, where impurities are removed by the filter 71, passes a piping and is led to the hydrogen generation apparatus 1 through the pump P. And the treated substance led to the hydrogen generation apparatus 1 is sent to the gas/liquid separator 72 through another piping. The treated substance is separated into the gases containing hydrogen and the liquid of the treated substance, and the gases containing the hydrogen are sent to the gas separator 50. And here, the gases are separated into the hydrogen and other gases as described above, and thus the hydrogen is recovered.

On the other hand, the liquid of the treated substance is again returned to the filter 71 and reused by circulation.

(Hydrogen Generation System)

Here will be described a concrete example of a hydrogen generation system thus described, based on FIG. 19.

Meanwhile, even if although water is cited as a treated substance in descriptions below, any of an aqueous medium, an organic compound, and the like is similarly passed, it bring out a same effect.

(1) At first, open valves V1, V2, and V3, supply water from the valve V1, and thereby form a minor water circulation line. Activate a water circulation pump 11 and circulate the water. Open valves V4 and V5 and then close the valve V3.

(2) Circulate the water through a major circulation line formed of a heater 12, the hydrogen generation apparatus 1, an electrolysis bath 13, a gas/liquid separator 14, the valve V5, the valve V2, the water circulation pump 11, and the valve V4. (3) Make a switch of the heater 12 ON. Meanwhile, to perform heating with the heater 12 is to further accelerate activation of water of the treated substance. Instead of the heater 12, for example, the heating means 4 in any of the hydrogen generation apparatuses 1d and 1e shown in FIGS. 9A and 9B can also be used. In addition, passing the water through any of the hydrogen generation apparatuses related to the present invention, energy is given to the water at a wave energy concentration field in the plate-form activation structural bodies I(S) and thereby the water is activated.

(4) Make a switch of the electrolysis bath 13 ON. Gases are generated by electrolyzing water. At this time the water is heated by the heater 12 (heating means 4), water molecules are further activated by the hydrogen generation apparatus 1, and resultingly, decomposition of the water within the electrolysis bath 13 is accelerated and a hydrogen generation amount per electric power is improved.

(5) A liquid, which contains bubbles discharged from the electrolysis bath 13, is led to the gas/liquid separator 14 and it separates nothing but the bubbles from the liquid, which contains the bubbles generated from the electrolysis bath 13.

(6) With respect to the bubbles separated by the gas/liquid separator 14, hydrogen is recovered by a membrane separation device 15 comprising a hydrogen permeation membrane, and gases containing oxygen, which cannot permeate the hydrogen permeation membrane, are discharged in an atmosphere as they are.

(7) On the other hand, the liquid where the bubbles are separated by the gas/liquid separator 14 is again circulated within the system by the water circulation pump 11.

(8) A water amount electrolyzed and consumed in operation is supplied as supply water from the valve V1.

Meanwhile, when activation of the hydrogen generation apparatus 1 of the present invention is high, the electrolysis bath 13 can be omitted and further the hydrogen generation apparatus 1 can also be arranged in series instead of the electrolysis bath 13.

EXAMPLES

Although the present invention will be described below in detail based on examples, it is not limited to these examples.

Example 1

This example is performed at a place, where sunlight does not come, and which place is not directly exposed to a room light.

Using silicon of 98% in purity, manufacture particles of a true sphere from 5 μm to 80 μm in diameter (150 μm at maximum) as shown in FIG. 2A, stack particles (P) of 100 cm$^3$ thus composed within a triangle flask of 300 cc in volume, and make a hydrogen generation apparatus comprising an activation structural body (P1) by the present invention as shown in FIG. 20.

Meanwhile, this hydrogen generation apparatus 100 airtightly connects a triangle flask 102, where the particles P mounted on a heating pedestal 101, are led, and a collection vial 105 for collecting gases within a water bath 103 filled with gases and icy water through a pipe 106.

Meanwhile, to fill the water bath 103 with the icy water is to make an inner atmospheric pressure of the collection vial 105 after taken out of the water bath 103 not become lower than a room pressure by condensing vapor within the water bath 103 in advance; and therefore, keep a temperature within the water bath 103 not more than 10 degrees Celsius.

In addition, because gases within the collection vial 105 are verified to be separated by differences in specific gravity thereof in a preparatory experiment, chips 107 composed of silicon are put in the collection vial 105 in advance in order to sufficiently agitate the gases before analyzing them by gas chromatography.

Next, fill refined water (92 degrees Celsius) till a tip of the collection vial 105 of 164 cc in volume from the triangle flask 102, leave it at this temperature, and collect gases, which are generated within the activation structural body thus composed, into the collection vial 105. Analyzing gases thus collected by gas chromatography, it results in obtaining a hydrogen gas of 78%, an oxygen gas of 5%, and other gases of 17% in volume.

Example 2

Repeat an experiment same as in the Example 1 except for keeping a temperature of refined water 50 or 90 degrees Celsius. As a result, a gas generation amount at 50 degrees Celsius is 28 cc per hour; a gas generation amount at 90 degrees Celsius is 56 cc per hour. From this experiment, it is found that a water decomposition speed at 90 degrees Celsius is accelerated, compared to that at 50 degrees Celsius.

Analyzing gases similarly collected by gas chromatography, it results in obtaining a hydrogen gas of 78%, an oxygen gas of 5%, and other gases of 17% in volume.

Examples 3 to 10

Repeat the Example 1 except for making a volume of an activation structural body 75 cm$^3$, a temperature of refined water 90 or 99 degrees Celsius, and a particle diameter of the activation structural body as shown in Table 2. A gas generation amount is included in Table 2.

TABLE 2

| Example | Particle Diameter (d) μm | Temperature (degrees Celsius) | Gas Generation Amount (cc/10 minutes) |
|---|---|---|---|
| 3 | d < 32 | 90 | 4.3 |
| 4 | d < 32 | 99 | 6.6 |
| 5 | 32 < d < 52 | 90 | 3.6 |
| 6 | 32 < d < 52 | 99 | 5.0 |
| 7 | 52 < d < 75 | 90 | 2.8 |
| 8 | 52 < d < 75 | 99 | 3.6 |
| 9 | 75 < d < 180 | 90 | 0.5 |
| 10 | 75 < d < 180 | 99 | 1.0 |

From the result of Table 2, the smaller the particle diameter of particles composing the activation structural bodies of the present invention is at a same temperature, the more the gas generation amount increases, and thereby it turns out that higher activation is shown. In addition, in a case of a same particle diameter the higher the temperature is, the more the gas generation amount increases, and thereby it turns out that the higher activation is shown.

In addition, as a result of repeated experiments, although what-like reason is not clear, a generation of a nitrogen gas is observed. In addition, is obtained air with a little bit excessive oxygen, where a volume ratio of the oxygen gas and the nitrogen gas is 1 versus about 3.4

Comparison Example 1

Performing same operation as in the Example 1 except for using a comparison activation structural body (PC), which is made with using irregular particles shown in FIG. 2B as particles composing an activation structural body, no gas generation is observed.

Examples 11 to 14

Same as in the Example 1, make activation structural bodies (P2 to P5) of the present invention with using Ti (activation structural body (P2)), Ni (activation structural body (P3)), Sm (activation structural body (P4)), and FC (activation structural body (P5)).

Examples 15 and Comparison Examples 2 and 3

Plate-Form Activation Structural Body

After performing an antistatic treatment for the activation structural body (P1) obtained in the Example 1, sinter it under a condition shown in Table 3 and thereby make a plate-form activation structural body (T1) of the present invention (Example 15).

Sinter the activation structural body (PC) obtained in the Comparison Example 1 under a condition shown in Table 3 and thereby make a comparison plate-form activation structural body (TC2) (Comparison Example 2). In addition, make a comparison activation structural body (TC3) in a same method as in the Example 15 except for not performing the antistatic treatment (Comparison Example 3). Meanwhile, the comparison plate-form activation structural body TC2 has an air gap ratio of a same range as the plate-form activation structural body T1, and that of TC3 is not less than 60%.

Physicality of these plate-form activation structural bodies is shown in Table 3.

TABLE 3

Figure 4C:
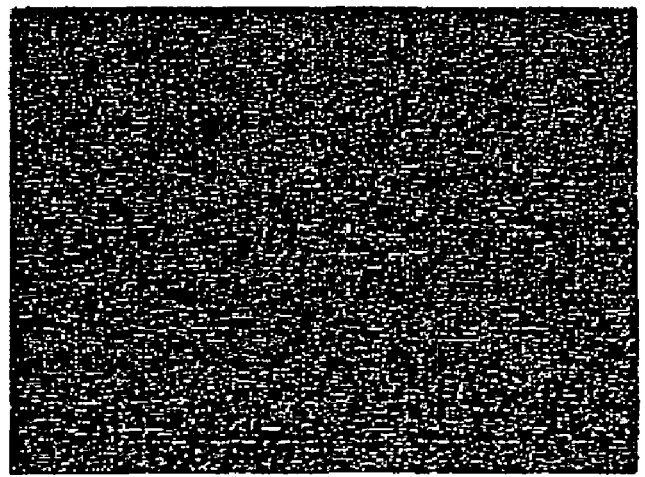

| Manufacturing Condition | Plate-Form Activation Structural Body (T1) | Plate-Form Activation Structural Body (TC2) | Plate-Form Activation Structural Body (TC3) |
| --- | --- | --- | --- |
| Sintering Temperature | 1,300 degrees Celsius | 1,300 degrees Celsius | 1,300 degrees Celsius |
| Sintering Time | 180 minutes | 180 minutes | 180 minutes |
| Sintering Pressure | 25 MPa | 25 MPa | 25 MPa |
| Thickness (mm) | 0.5 | 0.5 | 0.5 |
| Longitudinal (mm) | 20 | 20 | 20 |
| Traversal (mm) | 50 | 50 | 50 |
| Air Gap Ratio | 45 to 60% | 50 to 60% | 50 to 60% |
| Sectional Shape | FIG. 4A | FIG. 4B | FIG. 4C |
| With or Without Energy Concentration Field | With | Without | Without |

As obvious from FIGS. 4A to 4C, although the plate-form activation structural body T1 manufactured by the condition of the present invention has an energy concentration field between particles, it turns out that each of the comparison plate-form activation structural bodies TC2 and TC3, which deviate from the condition of the present invention, that is, do not have the energy concentration field, does not have a sufficient energy concentration field.

Meanwhile, using the plate-form comparison activation structural bodies TC1 and TC3, no gas generation is observed.

Examples 16

Other Activation Structural Bodies

Using the activation structural bodies (P2 to P5) of the present invention obtained by the Examples 11 to 14 and performing a same experiment as in the Example 15, a hydrogen generation is observed.

Thus it turns out that the activation structural bodies, which are comprised of any particles of titanium, nickel, samarium, and fluorocarbon manufactured under a predetermined condition, also have a same effect as an activation structural body where silicon particles are used.

Examples 17 and Comparison Examples 5 and 6

Utilizing the apparatus shown in FIG. 8 and performing a same experiment as in the Example 7 with using the plate-form activation structural body T1 of the present invention, and the comparison plate-form activation structural bodies TC2 and TC3, in the plate-form activation structural body T1 a remarkable generation of gases is observed, however in the comparison plate-form activation structural bodies TC2 and TC3 no gas generation is observed.

Analyzing gases collected in Example 17 by gas chromatography, it results in obtaining a hydrogen gas of 78%, an oxygen gas of 5%, and other gases of 17% in volume.

Example 18

Perform a same experiment as in the Example 15 except for using liquids shown in Table 4 and observe a gas (hydrogen) generation. A result thereof is shown in Table 4. Meanwhile, a gas generation state is evaluated with naked eyes, and a preferable generation is shown in **, a generation in *, and a little bit generation in ↓.

TABLE 4

| | Plate-Form Activation Structural Body (T1) | Plate-Form Activation Structural Body (TC2) | Plate-Form Activation Structural Body (TC3) |
| --- | --- | --- | --- |
| Water (Normal Temperature) | * | ↓ | ↓ |
| Alkali Ion Water | ** | ↓ | ↓ |
| Sea Water | ** | ↓ | ↓ |
| Acid Water | ↓ | ↓ | ↓ |
| Methanol (Polar Organic Solvent) | ** | ↓ | ↓ |
| Gasoline (Non-Polar Organic Solvent) | * | ↓ | ↓ |

Thus it turns out that the plate-form activation structural body of the present invention activates various treated substances such as electrolytic water (sea water), the organic solvent, and the non-polar organic solvent.

On the other hand, with respect to the comparison plate-form activation structural bodies TC2 and TC3, activation is not observed in any of the treated substances.

Example 19

Comparison With Warmed Case

Utilizing the apparatuses shown in FIGS. 9A and 9B and performing a same experiment as in the Example 15 with using the plate-form activation structural body T1 of the present invention, and the comparison plate-form activation structural bodies TC2 and TC3, a larger amount of gas generation than the apparatus shown in FIG. 8 is observed (liquid temperature, 92 degrees Celsius).

Example 20

Utilizing the apparatuses shown in FIGS. 10A and 10B and performing a same experiment as in the Example 15 with using the plate-form activation structural body T1 of the present invention, and the comparison plate-form activation structural bodies TC2 and TC3, a larger amount of gas generation than the apparatus shown in FIG. 8 is observed.

Example 21

Utilizing the apparatus shown in FIG. 11 and performing a same experiment as in the Example 15 with using the plate-form activation structural body T1 of the present invention, and the comparison plate-form activation structural bodies TC2 and TC3, a larger amount of gas generation than the apparatus shown in FIG. 8 is observed.

Example 22

Utilizing the apparatuses shown in FIGS. 12A and 12B and performing the same experiment as in the Example 15 with using the plate-form activation structural body T1 of the present invention, and the plate-form comparison activation structural bodies TC2 and TC3, a larger amount of gas generation than the apparatus shown in FIG. 8 is observed.

Example 23

Utilizing the apparatus shown in FIG. 13 and performing the same experiment as in the Example 15 with using the plate-form activation structural body T1 of the present invention, and the comparison plate-form activation structural bodies TC2 and TC3, a larger amount of gas generation than the apparatus shown in FIG. 8 is observed.

Example 24

Utilizing the apparatuses shown in FIGS. 14A and 14B and performing the same experiment as in the Example 15 with using the plate-form activation structural body T1 of the present invention, and the comparison plate-form activation structural bodies TC2 and TC3, a larger amount of gas generation than the apparatus shown in FIG. 8 is observed.

Thus, although the present invention is described, based on the embodiments and the examples, the invention is not specifically limited to these constitutions and compositions. For example, if the activation structural body has the energy concentration field between particles, elements and compounds composing the activation structural body are not specifically limited.

What is claimed is:

1. A hydrogen generation apparatus, comprising:
   a treated-substance container including a hydrogen discharge port; and
   an activation structural body including a plurality of particles, and an energy concentration field between the particles,
   wherein the activation structural body is arranged within said treated-substance container,
   wherein the energy concentration field activates a treated substance,
   wherein a gas including hydrogen is generated from the treated substance passing through said energy concentration field,
   wherein the particles consist essentially of a fluorocarbon, and
   wherein the particles are configured to amplify unique wave energy in the fluorocarbon.

2. A hydrogen generation apparatus according to claim 1, wherein said activation structural body includes a plate form.

3. A hydrogen generation apparatus according to claim 2, wherein said activation structural body includes a structure that separates from a liquid, a generated gas in an inside of said treated-substance container, and wherein said activation structural body is arranged at a position where contact with the liquid is not impeded by the generated gas.

4. A hydrogen generation apparatus according to claim 2, wherein said activation structural body is arranged in a vertical direction inside of said treated-substance container.

5. A hydrogen generation apparatus according to claim 2, wherein said activation structural body is provided that compartmentalizes said treated-substance container in an up/down direction.

* * * * *